United States Patent [19]
Smidt et al.

[11] Patent Number: 5,472,952
[45] Date of Patent: Dec. 5, 1995

[54] PARTIALLY HYDROLYZED PECTIN IN NUTRITIONAL COMPOSITIONS

[75] Inventors: Carsten R. Smidt; John R. Euber, both of Evansville, Ind.

[73] Assignee: Bristol-Myers Squibb Company, Del.

[21] Appl. No.: 33,719

[22] Filed: Mar. 18, 1993

[51] Int. Cl.⁶ .................................................. A61K 31/00
[52] U.S. Cl. .................................. 514/54; 514/2; 514/23; 514/53; 514/57; 60/458; 60/474; 60/557; 60/558; 60/725; 424/195.1; 424/600
[58] Field of Search .................... 424/195.1, 608; 514/323, 54, 53, 57, 60, 557, 558, 458, 474, 725, 867

[56] References Cited

U.S. PATENT DOCUMENTS

| | | | |
|---|---|---|---|
| 4,304,768 | 12/1981 | Staub et al. | 514/54 |
| 4,565,702 | 1/1986 | Morley et al. | 426/93 |
| 4,666,716 | 5/1987 | Sheth et al. | 424/195.1 |
| 4,950,655 | 8/1990 | Bochmann | 514/54 |
| 5,260,279 | 11/1993 | Greenberg | 514/21 |

OTHER PUBLICATIONS

H. H. Hoffman, et al., "Influence of a New Soluble Fiber on Gastrointestinal Complication Rate and Hydrogen Excretion," *Journal of Parenteral and Enteral Nutrition,* 17(1) Supplement, Jan.–Feb. 1993, p. 31S, Abstract No. 52.

*Primary Examiner*—John W. Rollins
*Attorney, Agent, or Firm*—Thomas R. Savitsky

[57] ABSTRACT

The present invention concerns nutritionally complete food compositions which contain partially hydrolyzed pectin. The partially hydrolyzed pectin has a peak molecular weight less than unmodified pectin and greater than 3,300.

20 Claims, 7 Drawing Sheets

PARTIALLY HYDROLYZED PECTIN IN NUTRITIONAL COMPOSITIONS

FIELD OF THE INVENTION

The present invention concerns partially hydrolyzed pectin of a particular molecular weight range for use in nutritional compositions.

BACKGROUND OF THE INVENTION

Diarrhea is a major problem in a substantial percentage of patients receiving enteral feeding (see, for example, Guenter, P. A., et al., "Tube-feeding-related Diarrhea in Acutely Ill Patients," *J. Parenter. Enter. Nutr.*, 15:277–280, 1991). Apart from patient discomfort, additional nursing care and hospitalization costs, such diarrhea can severely compromise patient health, because of depletion in fluid, electrolytes and other nutrients (see, for example, Frankenfield, D. C. and Beyer, P. L., "Soy-polysaccharide Fiber: Effect on Diarrhea in Tube-fed, Head-injured Patients," *Am. J. Clin. Nutr.*, 50:533–538, 1989). Therefore, control of diarrhea has major clinical, psychosocial and financial benefits. Obviously, nutritional compositions which can help control diarrhea are highly desired.

The nutritional significance of dietary fiber has become apparent in the last two decades, and more recently, dietary fiber also has been included in enteral nutrition formulas. Dietary fiber has been suggested to be beneficial in diarrhea management because it may regulate GI transit time (Potkins, et al., "Effects of Structural and Non-structural Polysaccharides in the Diet of the Growing Pig on Gastric Emptying Rate and Rate of Passage of Digesta to the Terminal Ileum and Through the Total Gastrointestinal Tract," *Br. J. Nutr.*, 65:391–413, 1991), adsorb excess luminal fluid, and/or be fermented to short chain fatty acids which stimulate colonic mucosal function and thus water and electrolyte absorption.

The effectiveness of commercially available enteral nutrition formulas with fiber (soy polysaccharide) is controversial (see, for example, Guenter, P. A., et al., "Tube-feeding-related Diarrhea in Acutely Ill patients," *J. Parenter. Enter. Nutr.*, 15:277–280, 1991; Frankenfield, D. C. and Beyer, P. L., "Soy-polysaccharide Fiber: Effect on Diarrhea in Tube-fed, Head-injured Patients," *Am. J. Clin. Nutr.*, 50:533–538, 1989; Shankardass, K., et al., "Bowel Function of Long-term Tube-fed Patients Consuming Formula With and Without Dietary Fiber," *J. Parenter Enter Nutr.*, 14:508–512, 1990). A more successful approach may be the inclusion of highly fermentable soluble fiber, such as pectin or guar gum (Zimmaro, D. M. et al., "Isotonic Tube Feeding Formula Induces Liquid Stool in Normal Subjects: Reversal by Pectin," *J. Parenter. Ent. Nutr.*, 13:117–123, 1989).

Pectin or guar gum as such are not suitable for use in liquid nutrition formulas as a source of dietary fiber, because they form very viscous aqueous solutions even at low concentrations. However, hydrolysis of pectin or guar gum dramatically decreases their viscosity (see, for example, vollmert, B., "Uber den alkalischen Pektinabbau," *Makromol. Chemie*, 5:110–127, 1950; Albersheim, P., et al., "Splitting of Pectin Chain Molecules in Neutral Solutions," *Arch. Biochem. Biophys.*, 90:46–51, 1960; T. P. Krovtchenko, I. Arnold, A. G. J. Vorogen and W. Pilnik, "Improvement of the Selective Depolymerization of Pectic Substances by Chemical β-elimination in Aqueous Solution," *Carbohyd. Polym.*, 19:237–242, 1992). Little is known, however, about the use of such hydrolyzed fiber in nutritional products.

It would be highly desirable to have a nutritional product containing a soluble fiber which is of sufficiently low viscosity to be suitable for use in nutritional products and be useful for the management of diarrhea.

SUMMARY OF THE INVENTION

The present invention is based on the discovery that pectin of limited hydrolysis is effective in the management of diarrhea. This observation is unexpected in that other partially hydrolyzed soluble fibers, such as guar gum, are not effective. We have also found that the extent of hydrolysis is critical in that extensively hydrolyzed (i.e., to a peak molecular weight level of 3,300 or lower) pectin loses its ability to control diarrhea. We have also found that in some instances a mixture of partially hydrolyzed pectin with an insoluble or non-fermentable fiber can be used.

Therefore, the present invention is directed to a nutritionally complete composition comprising (a) a nitrogen source, (b) a non-fiber carbohydrate source, (c) a lipid source, (d) vitamins and minerals, and (e) a fiber system comprising partially hydrolyzed pectin having a peak molecular weight less than unmodified pectin and greater than 3,300. This composition will be referred to herein as the "nutritionally complete" composition.

In another embodiment the present invention is directed to a nutritional composition which is not necessarily nutritionally complete. Such a composition can be a nutritional supplement and can be described as a nutritional supplement composition comprising (1) a fiber system comprising partially hydrolyzed pectin having a peak molecular weight less than unmodified pectin and greater than 3,300, and (2) 100% of the RDI of vitamins and minerals per 500 to 3000 kcal of total composition. This composition will be referred to herein as the "nutritional supplement".

When the term "composition" is used herein without modifier, such term shall apply to either the nutritionally complete composition or the nutritional supplement.

In another aspect, the present invention is directed to a fiber system comprising (i) partially hydrolyzed pectin having a peak molecular weight less than unmodified pectin and greater than 3,300; and (ii) at least one insoluble fiber.

In still another aspect, the present invention is directed to a fiber system comprising (I) partially hydrolyzed pectin having a peak molecular weight less than unmodified pectin and greater than 3,300; and (II) at least one non-fermentable fiber.

The present invention also concerns a method for treating diarrhea in a patient using the fiber of the invention.

DETAILED DESCRIPTION OF THE INVENTION

Figure 1:
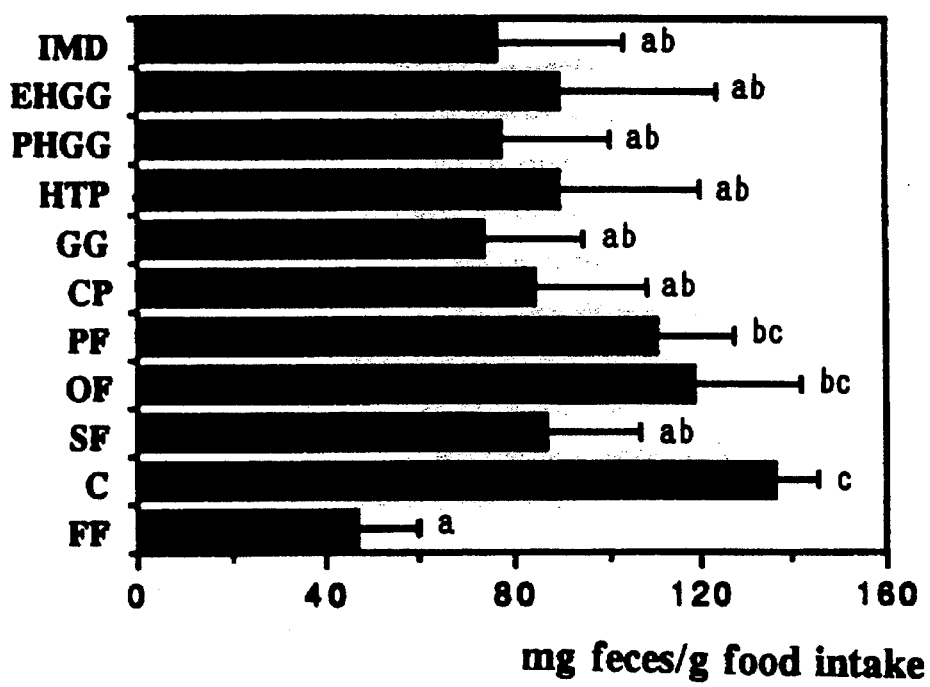
FIG. 1—Fecal output per gram of food intake for Example 6. Means±standard deviations. Means with common letters are not statistically significantly different (ANOVA, Scheffe's F-test, p≦0.05).

The partially hydrolyzed pectin of the present invention has a peak molecular weight of less than unmodified or intact pectin and greater than 3,300. We have found that when pectin is extensively hydrolyzed to a peak molecular weight of 3,300 or less, then its ability to control diarrhea is lost or markedly reduced. By the term "peak molecular weight" is meant molecular weight determined by the procedure described in Example 5 which is a modification of the procedure described by H. A. Deckers and C. Olieman, "Calibration and Application of High Performance Size Exclusive Columns for Molecular Weight Distribution of Pectins," *Carbohydrate Polymers*, 6:361–378, 1986.

Pectins for use herein typically have a peak molecular weight of 8,000 or greater. The pectins of the invention have a preferred peak molecular weight of between about 8,000 and about 500,000, more preferred is between about 10,000 and about 200,000, and most preferred is between about 15,000 and about 100,000.

The partially hydrolyzed pectins of the invention have a lower peak molecular weight than intact or unmodified pectin and, therefore, have a lower viscosity than unmodified pectin. This lower viscosity overcomes the problems of the art, thus allowing the partially hydrolyzed pectins of the invention to be facilely incorporated into nutritional compositions at physiologically meaningful levels. The viscosity of the partially hydrolyzed pectins of the invention is typically less than about 10 centipoise (cp), preferably less than about 6 cp, when measured as a 1% weight/weight aqueous solution at room temperature (20°–25° C.) using a Brookfield viscometer. The final composition of the invention in a form intended for consumption (i.e., either a ready-to-use formulation or a powder or concentrate reconstituted to normal dilution with water) will typically have a Brookfield viscosity of less than about 100 cp, more typically about 2 to about 100 cp and preferably about 5 to about 40 cp.

We have also found that in some instances it is preferred to use a combination of partially hydrolyzed pectin with one or more insoluble fibers. The term "insoluble fiber" as used herein refers to a dietary fiber in which at least 60 weight % of the total dietary fiber is insoluble dietary fiber as determined by Lee, S. et al., "Determination of Total, Soluble and Insoluble Dietary Fiber in Foods-enzymatic-gravimetric Method, MES-TRIS Buffer: Collaborative Study", *J.A.O.A.C Int.* 75:395–416, 1992. Examples of insoluble fibers useful herein are oat hull fiber, soy fiber, pea fiber, beet fiber, cellulose and corn fiber. Preferred insoluble fibers for use herein are soy fiber, oat hull fiber or a mixture thereof. A preferred fiber system for use in the present invention comprises (i) partially hydrolyzed pectin having a peak molecular weight less than unmodified pectin and greater than 3,300, and (ii) at least one insoluble fiber. Thus, a preferred fiber system of the invention comprises about 25 to about 75 weight % of partially hydrolyzed pectin and about 25 to about 75 weight % of insoluble fiber; more preferred is about 45 to about 55 weight % of partially hydrolyzed pectin and about 45 to about 55 weight % of insoluble fiber.

For some applications it is desirable to use a combination of partially hydrolyzed pectin with one or more non-fermentable fibers. The term "non-fermentable" as used herein refers to a dietary fiber which has a fermentability of less than 40% as determined by the method described in U.S. Pat. No. 5,085,883, incorporated herein by reference, which is the same method described in Titgemeyer, et al, "Fermentability of Various Fiber Sources by Human Fecal Bacteria in vitro," *American Journal of Clinical Nutrition*, 53:1418–1424, 1991. Examples of non-fermentable fibers include carboxymethyl-cellulose, oat hull fiber, corn bran, mixtures thereof, and the like. Thus, a particular fiber system of the invention comprises about 25 to 75 weight % of partially hydrolyzed pectin and about 25 to about 75 weight % of non-fermentable fiber; preferred is about 45 to about 55 weight % partially hydrolyzed pectin and about 45 to 55 weight % of non-fermentable fiber.

The amount of fiber system present in the composition of the invention (either nutritionally complete or nutritional supplement) is typically about 0.1 g to about 20 g per 100 kcal of total composition, preferred is about 0.25 g to about 10 g, and more preferred is about 0.4 g to about 3 g. As alluded to above, the fiber system can be 100% partially hydrolyzed pectin or a combination of partially hydrolyzed pectin with other fibers.

The partially hydrolyzed pectins of the present invention can be prepared by any means known in the art to reduce molecular weight. Examples of said means are chemical hydrolysis, enzymatic hydrolysis and mechanical shear. A preferred means of reducing the molecular weight is by alkaline or neutral hydrolysis at elevated temperature, for example, 80°–95° C.

The fiber system of the invention (i.e., partially hydrolyzed pectin or partially hydrolyzed pectin in combination with an insoluble or non-fermentable fiber) is incorporated into a nutritionally complete or nutritional supplement food composition.

The nutritional composition of the present invention (nutritionally complete or nutritional supplement) is enteral; that is, it is designed for oral, intragastric, or transpyloric use. The composition of the invention may be an infant formula or adult nutritional composition. The composition also can be milk-based, soy-based, or based on other food sources.

By the term "nutritionally complete" is meant that the composition contains adequate nutrients to sustain healthy human life for extended periods. The nutritionally complete composition of the invention contains ingredients which are designed to meet the nutritional needs of mammals, especially humans, such as a nitrogen source (i.e., amino acids and/or protein), a lipid source, and a carbohydrate source. The nutritionally complete composition of the invention can be an infant or adult nutritional composition. Typically milk, skim milk, casein, hydrolyzed casein, hydrolyzed whey protein, whey, vegetable protein (e.g. soy protein isolate), hydrolyzed vegetable protein (e.g. soy), animal oils, vegetable oils, starch, sucrose, lactose and/or corn syrup solids will be added to the nutritionally complete composition to supply part or all of the amino acids and/or protein, lipid, and carbohydrate as well as other nutrients such as vitamins and minerals.

In the nutritionally complete composition of the invention the amount of nitrogen source (i.e., amino acids and/or protein) per 100 kcal of total composition is typically about 1 g to about 10 g, preferably about 2 g to about 6 g; the amount of lipid source per 100 kcal of total composition is typically greater than 0 g up to about 6 g, preferably about 0.5 g to about 5.5 g and more preferably about 2 g to about 5.5 g; and the amount of non-fiber carbohydrate source per 100 kcal of total composition is typically about 5 g to about 20 g, preferably about 7.5 g to about 15 g. The amount of vitamins and minerals in the nutritionally complete composition is typically sufficient to meet 100% of the U.S. recommended daily intake (RDI) in about 500 to about 3,000 kcal, preferable is about 1,000 to about 3,000 kcal.

In the nutritional supplement of the invention the amount of vitamins and minerals is sufficient to meet 100% of the RDI in about 500 to about 3,000 kcal, preferably in about 1,000 to about 3,000 kcal. As used herein, the RDI's are intended to mean those published in the Federal Register, Vol. 58, No. 3, Wednesday, Jan. 6, 1993, page 2227 which are as follows:

Vitamin A, 5,000 International Units

Vitamin C, 60 milligrams

Thiamin, 1.5 milligrams

Riboflavin, 1.7 milligrams

Niacin, 20 milligrams

Calcium, 1.0 gram

Iron, 18 milligrams

Vitamin D, 400 International Units

Vitamin E, 30 International Units

Vitamin $B_6$, 2.0 milligrams

Folic acid, 0.4 milligrams

Vitamin $B_{12}$, 6 micrograms

Phosphorus, 1.0 gram

Iodine, 150 micrograms

Magnesium, 400 milligrams

Zinc, 15 milligrams

Copper, 2 milligrams

Biotin, 0.3 milligram

Pantothenic acid, 10 milligrams

A preferred nutritional supplement of the invention comprises (1) a fiber system comprising partially hydrolyzed pectin having a peak molecular weight less than unmodified pectin and greater than 3,300, (2) 100% of the RDI of vitamins and minerals per 500 to 3,000 kcal of total composition, (3) a nitrogen source, (4) a non-fiber carbohydrate source, and, optionally (5) a lipid source. In the nutritional supplement of the invention the amount of nitrogen source per 100 kcal of total composition is typically about 0 g to about 10 g, preferably about 3 g to about 7 g; the amount of lipid source per 100 kcal of total composition is typically 0 g to about 5 g, preferably 0.5 g to about 3 g; and the amount of non-fiber carbohydrate source per 100 kcal of total composition is typically about 5 g to about 20 g, preferably about 7.5 g to about 15 g.

The non-fiber carbohydrate source can be any carbohydrate known in the art to be suitable for use in nutritional compositions. Typical carbohydrate sources include sucrose, fructose, xylitol, glucose, maltose, maltodextrins, lactose, corn syrup, corn syrup solids, rice syrup solids, rice starch, corn starch, modified corn starch, modified tapioca starch, rice flour, and the like.

The lipid source can be any lipid or fat known in the art to be suitable for use in nutritional compositions. Typical lipid sources include milk fat, safflower oil, canola oil, egg yolk lipid, olive oil, cotton seed oil, coconut oil, palm oil, palm kernel oil, soybean oil, sunflower oil, fish oil and fractions derived thereof such as palm olein, medium chain triglycerides (MCT), and esters of fatty acids wherein the fatty acids are, for example, arachidonic acid, linoleic acid, palmitic acid, stearic acid, docosahexaeonic acid, eicosapentaenoic acid, linolenic acid, oleic acid, lauric acid, capric acid, caprylic acid, caproic acid, and the like. High oleic forms of various oils are also contemplated to be useful herein such as high oleic sunflower oil and high oleic safflower oil.

Medium chain triglycerides contain higher concentrations of caprylic and capric acid than typically found in conventional oils, e.g., approximately three-fourths of the total fatty acid content is caprylic acid and one-fourth is capric acid.

Moreover, it is also possible to use transesterified or interesterified lipids as part of the lipid source for the composition of the invention. Such lipids can be glycerol esters wherein the 1, 2, or 3 position is substituted with specific fatty acids for the purposes of obtaining the desired nutritional, physical, or functional characteristics of the lipid.

The nitrogen source can be any protein and/or amino acid mixture known in the art to be suitable for use in nutritional compositions. Typical nitrogen sources are animal protein, vegetable protein such as soy protein, milk protein such as skim milk protein, whey protein and casein, and amino acids (or salts thereof) such as isoleucine, phenylalanine, leucine, lysine, methionine, threonine, tryptophan, valine, arginine, glutamine and the like. Another amino acid source is hydrolyzed protein (protein hydrolysate) optionally supplemented with amino acids.

The protein hydrolysate useful in the invention may be any suitable protein hydrolysate utilized in a nutritional formula such as soy protein hydrolysate, casein hydrolysate, whey protein hydrolysate, other animal and vegetable protein hydrolysates, and mixtures thereof. The protein hydrolysate of the composition of the invention is preferably a soy protein, whey protein, or a casein hydrolysate comprising short peptides and amino acids, optionally supplemented with additional amino acids. The hydrolyzed protein of the composition of the invention is also preferably supplemented with various free amino acids to provide a nutritionally balanced amino content. Examples of such free amino acids include L-tryptophan, L-methionine, L-cystine, L-tyrosine, and L-arginine.

Nutritionally complete compositions contain all vitamins and minerals understood to be essential in the daily diet and these should be present in nutritionally significant amounts. Those skilled in the art appreciate that minimum requirements have been established for certain vitamins and minerals that are known to be necessary for normal physiological function or special metabolic or pathologic conditions. Practitioners also understand that appropriate additional amounts (overages) of vitamin and mineral ingredients need to be provided to compensate for some loss during processing and storage of such compositions.

To select a specific vitamin or mineral compound to be used in the composition of the invention requires consideration of that compound's chemical nature regarding compatibility with the processing and shelf storage.

Examples of minerals, vitamins and other nutrients which may be present in the nutritionally complete composition of the invention include vitamin A, vitamin $B_6$, vitamin $B_{12}$, vitamin E, vitamin K, vitamin C, folic acid, thiamine, inositol, riboflavin, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Vitamins and minerals listed above which are not present in the current RDI list may also optionally be present in the nutritional supplement of the invention. Minerals are usually added in salt form. In addition to compatibility and stability considerations, the presence and amounts of specific minerals and other vitamins will vary somewhat depending on the intended consumer population.

The composition of the invention also typically contains emulsifiers and stabilizers such as lecithin, (e.g., egg or soy), mono- and diglycerides, stearoyl lactylates, succinylated monoglycerides, diacetyl tartaric acid esters of monoglycerides, polyglycerol esters of fatty acids, carrageenan, xanthan gum, guar gum, carboxymethyl cellulose, or any mixture thereof.

The composition of the invention may optionally contain other substances which may have a beneficial effect such as lactoferrin, nucleotides, nucleosides, immunoglobulins, and the like.

The composition of the invention may also optionally contain natural or artificial flavorants or colorants such as vanilla, chocolate, coconut, banana, strawberry flavors.

The osmolality of the liquid composition of the invention (when ready to consume) is typically about 100 to about 1100 mOsm/kg $H_2O$, more typically about 200 to about 700 mOsm/kg $H_2O$.

The composition of the invention can be sterilized, if desired, by techniques known in the art, for example, heat treatment such as autoclaving or retorting, irradiation, and the like.

The composition of the invention can be packaged in any type of container known in the art to be useful for storing nutritional products such as glass, lined paperboard, plastic, coated metal cans and the like.

The present invention is also directed to a method for treating diarrhea in a patient in need of treatment comprising administering to said patient an effective amount of the partially hydrolyzed pectin fiber of the invention. A typical effective amount of fiber for the method of the invention is about 10 to about 80 grams per day, preferred is about 20 to about 50 grams per day. By the term "treatment" is meant control, amelioration, cure, and/or prophylaxis of diarrhea. Treatment is recognized to be effective when abnormally soft or liquid stool consistency is harder or firmer, excessive fecal water output is reduced, and/or abnormally short fecal transit time is prolonged. In the method of the invention the partially hydrolyzed pectin is administered orally, most conveniently in the nutritionally complete composition or the nutritional supplement. Of course, in the method of the invention the partially hydrolyzed pectin can be administered alone or in combination with other fibers such as one or more non-fermentable or insoluble fibers. The method of the invention is suitable for use with mammals, particularly humans.

The invention is further illustrated by the following non-limiting examples. Percentages are by weight unless indicated otherwise.

EXAMPLE 1

An enteral nutritional composition, when used at normal dilution, supplies the nutrient levels listed in the following table.

|  | 100 ml | % U.S. RDA |
|---|---|---|
| Calories | 106 | * |
| Protein, g | 4.6 | 7 |
| Fat, g | 3.5 | * |
| Carbohydrate, g | 14 | * |
| Dietary Fiber, g | 0.59 | * |
| Water, g | 84 | * |
| Vitamin A, IU | 350 | 7 |
| Vitamin D, IU | 42 | 11 |
| Vitamin E, IU | 2.1 | 7 |
| Vitamin K, µg | 9.7 | * |
| Vitamin C, mg | 12.7 | 21 |
| Folic Acid, µg | 42 | 11 |
| Thiamine, mg | 0.16 | 11 |
| Riboflavin, mg | 0.18 | 11 |
| Niacin, mg | 2.1 | 11 |
| Vitamin $B_6$, mg | 0.21 | 11 |
| Vitamin $B_{12}$, µg |  |  |
| Biotin, µg | 32 | 11 |
| Pantothenic Acid, mg | 1.06 | 11 |
| Calcium, mg | 84 | 8 |
| Phosphorus, mg | 70 | 7 |
| Iodine, µg | 10.5 | 7 |
| Iron, mg | 1.27 | 7 |
| Magnesium, mg | 28 | 7 |
| Copper, mg | 0.14 | 7 |
| Zinc, mg | 1.39 | 9 |
| Manganese, mg | 0.18 | * |
| Chloride, mg | 139(3.9 mEq) | * |
| Potassium, mg | 139(3.6 mEq) | * |
| Sodium, mg | 72(3.1 mEq) | * |

*U.S. Recommended Daily Allowance (U.S. RDA) has not been established.

The dietary fiber can be partially hydrolyzed pectin or partially hydrolyzed pectin in combination with soy fiber, oat hull fiber or a combination thereof. The osmolality is 480 mOsm/liter. The composition can also contain flavors such as vanilla, chocolate, or strawberry.

EXAMPLE 2

Another enteral nutritional composition of the invention, when used at normal dilution, supplies the nutrient level listed in the following table.

|  | 100 ml | % U.S. RDA |
|---|---|---|
| Calories | 106 | * |
| Protein, g | 4.4 | 10 |
| Fat, g | 4.5 | * |
| Carbohydrate, g | 12.3 | * |
| Dietary Fiber, g | 1.44 | * |
| Water, g | 85 | * |
| Vitamin A, IU | 420 | 8 |
| Vitamin D, IU | 34 | 8 |
| Vitamin E, IU | 6.3 | 21 |
| Vitamin K, µg | 10.6 | * |
| Vitamin C, mg | 25 | 42 |
| Folic Acid, µg | 34 | 8 |
| Thiamine, mg | 0.32 | 21 |
| Riboflavin, mg | 0.36 | 21 |
| Hiacin, mg | 4.2 | 21 |
| Vitamin $B_6$, µg | 0.42 | 21 |
| Vitamin $B_{12}$, µg | 1.27 | 21 |
| Biotin, µg | 25 | 8 |
| Pantothenic Acid, mg | 2.1 | 21 |

|  | 100 ml | % U.S. RDA |
|---|---|---|
| Choline, mg | 42 | * |
| Calcium, mg | 85 | 8 |
| Phosphorus, mg | 85 | 8 |
| Iodine, µg | 12.7 | 8 |
| Iron, mg | 1.52 | 8 |
| Magnesium, mg | 34 | 8 |
| Copper, mg | 0.17 | 8 |
| Zinc, mg | 1.69 | 11 |
| Manganese, mg | 0.25 | * |
| Chloride, mg | 144(4.1 mEq) | * |
| Potassium, mg | 161(4.1 mEq) | * |
| Sodium, mg | 93(4 mEq) | * |
| Selenium, µg | 8.5 | * |
| Chromium, lµg | 8.5 | * |
| Molybdenum, µg | 21 | * |
| Taurine, mg | 12.7 | * |
| L-carnitine, mg | 19 | * |

*U.S. Recommended Daily Allowance (U.S. RDA) has not been established.

The dietary fiber can be partially hydrolyzed pectin or partially hydrolyzed pectin in combination with soy fiber, oat hull fiber or a combination thereof. The osmolality is 400 mOsm/liter.

EXAMPLE 3

Preparation of Partially Hydrolyzed Fibers

The procedure for preparation of soluble, low viscosity guar gum used in Example 6 is as follows. Quantities listed are for treatment of 1000 g guar gum. Guar gum starting material was obtained from Sigma Chemical Co., St. Louis, Mo., U.S.A.

a) Heat 19 L water to 50° C. Maintain this temperature.

b) Add 3.9 ml Gamanase 1.5 L enzyme (from Novo Nordisk Bioindustrials, Inc., Danbury, Conn., U.S.A.) to the water.

c) Over a 15 minute period add 1000 g guar gum.

d) Stir for 20 min.

e) Inactivate the enzyme by heating to 90°–95° C. for 10 minutes.

f) Cool to 50° C.

g) Add 3000 g sucrose to the guar gum solution.

h) Spray dry.

The procedure for preparation of the low viscosity pectin used in Example 6 is as follows. Pectin starting material was obtained from Sigma Chemical Co., St. Louis, Mo., U.S.A.

A) Mix 1000 g pectin with 1300 mL of ethanol.

B) Heat 19 L water to 96° C. Maintain this temperature.

C) Slowly add pectin/ethanol slurry to water while stirring. Monitor pH and maintain a pH of 7.0 with a 50% w/w solution of KOH.

D) After all the pectin is added, maintain temperature for 20 minutes.

E) Cool to 49° C.

F) Add 3000 g of sucrose.

G) Spray dry.

The procedure for preparing hydrolyzed pectin and guar gum used in Example 7 is as follows. Pectin starting material was Genu HM Sugarless pectin, Hercules, Inc., Wilmington, Del., U.S.A. The guar gum starting material was from Sigma Chemical Co., St. Louis, Mo., U.S.A. Gamanase enzyme is from Novo Nordisk Bioindustrials, Inc., Danbury, Conn., U.S.A. Biopectinase 300 L enzyme and Biomacerase 2 enzyme are from Quest International Bioproducts Group, Sarasota, Fla., U.S.A.

Procedure (Hydrolyzed Pectin A)

1) Heat 10 L deionized water containing buffering agents (58.35 g KOH, 133.36 g $Na_2HPO_4$, 133.36 g $K_2HPO_4$) to 60°–62° C.

2) Dry blend 1000 grams Genu HM Sugarless pectin with 3000 grams sucrose.

3) Add dry blend to buffering solution (60°–62° C.) while stirring.

4) Maintain at 60° C. for 20 minutes.

5) Cool to room temperature (R.T., 20°–25° C.) in large ice bath.

6) Analysis: Viscosity=55 cps (R.T.), pH 6.40 (R.T.). Total solids=30.08%.

7) Freeze dry.

Procedure (Hydrolyzed Pectin B)

1) Heat 18.9 L deionized water to 45° C. and add 43.2 ml Biomacerase 2 enzyme and 16.2 ml Biopectinase 300 L enzyme.

2) Dry blend 1000 grams Genu HM Sugarless pectin with 3000 grams of sucrose.

3) Add dry blend to enzyme/water slowly (45° C.) while stirring.

4) Adjust to pH 4.0 with 20% KOH.

5) Maintain at 45° C. for 180 minutes. Maintain pH first 90 minutes by adding KOH. (608.10 grams 20% KOH).

6) Heat to 90°–95° C., stir 10 minutes and cool to room temperature.

7) Analysis: Viscosity=4.59 cps. Total solids=16.98%.

8) Freeze dry.

Procedure (Hydrolyzed Guar Gum B)

1) Heat 19.0 L deionized water to 50° C. and add 0.470 ml Novo Gamanase 1.5 L enzyme.

2) Add 1000 grams Sigma Guar Gum while stirring.

3) Maintain at 50° C. for 30 minutes.

4) Heat to 90° C. with mixing and maintain 10 minutes.

5) Cool to room temperature.

6) Analysis (guar solution, before sucrose addition)— Viscosity=980 cps (R.T.), total solids=4.54%, pH=5.27 (R.T.).

7) Add 3000 g sucrose.

8) Freeze dry.

Procedure (Hydrolyzed Guar Gum C)

1) Heat 19.0 L deionized water to 50° C. and add 5.66 ml Novo Gamanase 1.5 L enzyme.

2) Add 1000 grams Sigma Guar Gum while stirring.

3) Maintain at 50° C. for 120 minutes.

4) Heat to 90° C. with mixing and maintain 10 minutes.

5) Cool to room temperature.

6) Analysis (guar solution, before sucrose addition)— Viscosity=40.05 cps, total solids 4.73% (R. T.), pH 5.23 (R. T.).

7) Add 3000 g sucrose.

8) Freeze dry.

EXAMPLE 4

Viscosity Measurement

1) Brookfield viscometer model LVT (Brookfield Engineering Laboratories, Inc., Stoughton, Mass., U.S.A.) with UL adapter is used.

2) 1% (weight/weight) solution of fiber (e.g., partially hydrolyzed pectin) in deionized water is prepared at room temperature (20°–25°) and stirred until complete dissolution is obtained. If the sample contains sucrose, material adequate to obtain a 1%, w/w, solution of fiber is employed.

3) Viscosity is measured at room temperature (20°–25°) using a rotational speed which yields a near mid-scale reading, or if this is not feasible, the highest reading obtainable.

4) The scale reading (viscosity) is taken when equilibrium conditions are obtained.

EXAMPLE 5

Molecular Weight Determinations

An HPLC system (Dionex Series 4500 Chromatography System) is equipped with a precolumn (Shodex Ionpak KS-800P) and 3 analytical gel permeation columns (Shodex Ionpak KS-805, KS-803 and KS-801 in series) in a column oven maintained at 65° C., and a pulsed amperometric detector (PAD; Dionex) with 1N sodium hydroxide as post-column reagent. Flow rate is 1.0 ml/minute. Mobile phase is 0.5M acetate buffer, pH 3.7 (for 2000 ml: 50 ml glacial acetic acid+ 9.844 g sodium acetate+28.412 g sodium sulfate dissolved in distilled water, pH adjusted to 3.7). Soluble fiber samples are dissolved in mobile phase at 0.25% (w/v) and passed through a 0.22 μm syringe filter. Volumes of 10 μl are injected. Dextrans (MW: 5, 80, 150, 270, 670 and 2,000 kd, Fluka Chemical Corp.) dissolved in mobile phase are used as standards. "Peak molecular weight" is defined as the molecular weight at the peak maximum of the predominant peak of the chromatogram.

EXAMPLE 6

Protocol

One hundred twenty male Sprague-Dawley rats (200–225 g, approx. 50 days old) were obtained from Charles River Laboratories, Portage, Michigan. Rats were kept at 22°–24° C. and 40–60% relative humidity.

Upon receipt, rats were weighed and housed in individual stainless steel cages. The animals were randomly assigned by body weight to 12 experimental groups, 10 rats per group. Water was provided ad libitum.

Fiber-free AIN-76 diet with approximately equal amounts of cornstarch and sucrose was prepared and used as the basal diet (composition shown in Table 1). Fiber sources were included at levels providing 8% dietary fiber at the expense of cornstarch (shown in Table 2). This is within the range of effective fiber levels used in similar study designs (e.g., Farness, P. L. and Schneeman, B. O., "Effects of Dietary Cellulose, Pectin and Oat Bran on the Small Intestine in the Rat," J. Nutr., 112:1315–1319, 1982) This level of dietary fiber (20.8 g/1000 cal) is higher than the level typically used in human formula diets (e.g., 13.6 g/1000 cal), because rats ferment and digest dietary fiber more extensively (due to their large cecum) than humans. There was a fiber-free and a rodent chow-fed control group (shown in Table 2). Total, soluble and insoluble dietary fiber contents of each fiber source and diet were determined using a modification of the enzymatic-gravimetric AOAC method by Prosky (Prosky, L., et al., "Determination of Insoluble, Soluble and total Dietary Fiber in Foods and Food Products: Interlaboratory Study," *J. Assoc. Off. Anal. Chem.*, 71(5), 1017–1023, 1988). An increased ethanol concentration allowed for more complete recovery of low molecular weight soluble dietary fiber.

Rats were maintained on these diets for three weeks. This time frame was chosen to elicit measurable differences in the study parameters, and is within the range of study periods used by others (Farness, P. L. and Schneeman, B. O., "Effects of Dietary Cellulose, Pectin and Oat Bran on the Small Intestine in the Rat," *J. Nutr.*, 112:1315–1319, 1982). During this period, food intake, body weight, and stool consistency were assessed at weekly intervals. Stool consistency was assessed using a scale of four categories. The animals were maintained on a 12-hour reversed light/dark cycle (dark from 0700–1900 hours), and diets were provided daily from 0700 hours to 0900 hours to synchronize their food intake patterns. This cycle and feed pattern was needed to decrease variability of transit time determinations (see below).

During a metabolic period from day 14 to day 21, fecal moisture and dry and wet fecal weights, as well as food intake was measured.

On days 14 and 18, carmine red was administered via the diet at 0700 hours, and the time until first appearance in the feces was recorded.

Complete fecal collections were made during the period from the first until the second appearance of dye (approximately from days 15 to 19), and food intake was measured from the time of the first to the second dye administration. This ensured that only those feces representing the food intake during the four-day period were included in the analysis. All feces collected during this period were freeze-dried for measurements of dry weights. On day 20, feces were collected fresh (manual expression) from each animal, immediately weighed, then freeze-dried and weighed again, to determine fecal moisture content. Total fecal output on a wet weight basis was extrapolated from the measured fecal dry weights using percent moisture.

On day 21 beginning at 0700 hours, all rats (fasted) were weighed and euthanatized by $CO_2$ asphyxiation. The abdominal cavity was opened, and the small intestine, cecum, and colon were removed, washed with saline, weighed, freeze-dried and weighed again.

Statistical analysis of the data was performed by Analysis of Variance (ANOVA) and Scheffe's F-test.

TABLE 1

| Composition of Basal Diet | |
|---|---|
| Ingredient (Batch or Lot No.) | Amount (g/kg) |
| Casein, ANRC, Sheffield | 200 |
| L-Methionine | 1.5 |
| Corn oil | 50 |
| Corn Starch | 351 |
| Sucrose | 350 |
| USP XVII Mineral Mix | 35 |
| AIN-76A Vitamin Mix, Teklad | 10 |
| Choline Bitartrate | 2 |
| Tenox-4, Eastman Kodak | 0.5 |
| Total | 1000 |

Table 2

Amounts of Fiber Sources in Test Diets Providing 8% Total Dietary Fiber 1) fiber-free control diet
2) 8.21% α-cellulose (Teklad), 97.5% TDF*

3) 10.04% soy polysaccharide (FIBRIM, Protein Technologies), 79.7% TDF 4) 9.15% oat hull fiber (Snowite, Canadian Harvest), 87.4% TDF 5) 8.48% pea fiber (Centara III, Woodstone), 94.3% TDF 6) 8.88% citrus pectin (Sigma), 90.1% TDF 7) 9.49% guar gum (Sigma), 84.3% TDF 8) 8.6% partially hydrolyzed pectin (heat treated, prepared according to Example 3, molecular weight of 9,900 daltons), 93% TDF 9) 14.9% partially hydrolyzed guar gum (enzyme hydrolyzed, prepared according to Example 3), 53.8 % TDF 10) 9.67% partially hydrolyzed guar gum (Sunfiber, Sandoz), 82.8% TDF 11) 14.9% indigestible maltodextrin (Fibersol-2, Matsutani), 53.6% TDF 12) rodent chow

*TDF: total dietary fiber

Results and Conclusions

Diets/Experimental Groups. All fiber-containing diets were formulated to contain 8% total dietary fiber as described in the study protocol. Total dietary fiber content of each diet was confirmed by the AOAC method (Prosky, L., et al., "Determination of Insoluble, Soluble and total Dietary Fiber in Foods and Food Products: Interlaboratory Study," *J. Assoc. Off. Anal. Chem.*, 71:1017–1023, 1988), and found to be reasonably close to 8% (7.7–9.4%). This fiber level is frequently used in studies using the rat (Ide, T., et al., "Hypolipidemic Effect of Guar Gum and its Enzyme Hydrolysate in Rats Fed Highly Saturated Fat Diets," *Ann. Nutr. Metab.*, 35:34–44, 1991; Jacobs, L. R. and Lupton, J. R., "Effect of Dietary Fibers on Rat Large Bowel Mucosal growth and Cell Proliferation," *Am. J. Physiol.*, 246:G378–G385, 1984) and thus allows comparisons between studies. Experimental groups of this study are as follows:

| Group ID | Feeding Regimen | Physical Properties* |
|---|---|---|
| FF | fiber-free | — |
| C | α-cellulose (Teklad, non-nutritive fiber) | LV,I |
| SF | soy fiber (Protein Technologies, Fibrim) | MV,I |
| OF | oat hull fiber (Canadian Harves, Snowite) | LV,I |
| PF | pea fiber (Woodstone, Centara III) | LV,I |
| CP | citrus pectin (Sigma) | HV,S |
| GG | guar gum (Sigma) | HV,S |
| HTP | partially hydrolyzed (heat treated) pectin | LV,S |
| PHGG | partially hydrolyzed guar gum | LV,S |
| EHGG | extensively hydrolyzed guar gum (Sandoz, Sunfiber) | LV,S |
| IMD | indigestible maltodextrin (Matsutani, Fibersol-2) | LV,S |
| RC | rodent chow (Purina, laboratory chow) | — |

*Abbreviations for physical properties of dietary fibers:
LV = low viscosity, MV = medium viscosity, HV = high viscosity, S = mostly soluble, I = mostly insoluble. Low viscosity means a viscosity less than 10 cp; medium viscosity means a viscosity between 10 and 100 cp; and high viscosity means a viscosity greater than 100 cp.

Body Weights. Initial body weights were not different between groups, averaging 222±7 g (Table 3). Mean weight gain for the 22-day study period was 31 g.

Food Intake. Food intake measurements made on days 7–10 and days 17–20 (Table 3) did not reveal significant differences between groups with an overall mean of 10.7±2.3 g/d. However, during both intervals food intake tended to be lowest for groups FF, IMD and EHGG, and highest for groups SF and OF (food intake for RC-fed rats was not measured).

Stool Frequency. As a measure of gastrointestinal regularity, stool frequency was recorded as the number of study days at which animals did not produce feces (Table 4). FIG. 1 shows the percent of study days when feces were produced. The animals in most groups were regular, i.e. produced feces every or almost every day. However, several rats fed EHGG or IMD initially did not produce feces for up to 6 days, but after 2 weeks all animals were regular. Two animals from the PHGG group did not produce any feces for 5 consecutive days.

Stool Consistency. Every day, fecal consistency was recorded using a scale of four scores: 1=normal, 2=slightly soft, 3=soft, and 4=unformed (diarrhea). Table 4 shows the number of study days on which animals produced feces of each of the categories and the mean stool consistency scores for the entire study period. IMD caused significantly softer stools (average score: 1.9±0.6) than the other treatments (average scores: 1-1.2). In the IMD group there were 20 observations with unformed stools and 39 with soft stools. In the EHGG group there was one observation with unformed stools and seven with soft stools.

Since the measurement was performed only once a day, some hardening of fecal pellets took place with prolonged air exposure. Thus, the measurement tended to be less sensitive than one obtained by assessing freshly expressed feces, which was performed on day 22 for fecal moisture determinations.

The day-22 mean scores were: IMD: 2.3±0.7, EHGG: 1.4±0.5, and all other treatments: 1±0. Again, IMD-fed animals produced a significantly softer stool compared to all other treatments. The variation between animals in the IMD and EHGG groups was large, however. While a few rats in these groups consistently had soft or unformed stools, others consistently produced normal or slightly soft stools.

The softer stools observed with IMD and to a lesser extent with EHGG may have been related to osmotic effects. Both IMD an EHGG are dietary fiber sources containing primarily low molecular weight oligomers and polymers. The molecular weight distribution of IMD and EHGG, as determined by gel permeation chromatography, shows peaks at approximately 5000 and 9,000, respectively, but extends well into the range of saccharides with degrees of polymerization of two. All other tested fibers are of highly polymeric structure, with molecular weights often ranging into the millions. Significant amounts of indigestible low-molecular weight oligomers and polymers from IMD or EHGG may have entered the distal colon and impaired water absorption due to osmotic effects. This would have prevented normal formation of fecal pellets.

Figure 2:
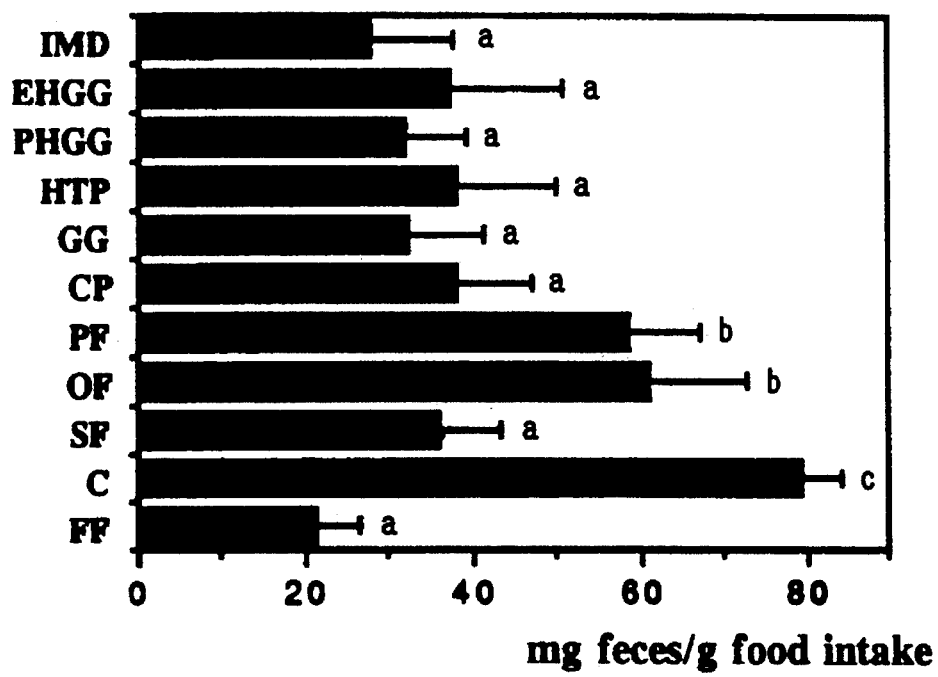
FIG. 2—Fecal dry matter output per gram of food intake for Example 6. Means±standard deviations. Means with common letters are not statistically significantly different (ANOVA, Scheffe's F-test, p≦0.05).

Fecal Output. Because of the variation observed for food intake (see above), interpretation of fecal output data is easiest on a per gram food intake basis (FIG. 1 and 2). Fermentable fibers, such as SF, CP and CG, provided less fecal bulk than the non-fermentable fibers, but somewhat more than FF. The heat-or enzyme-hydrolyzed fibers (HTP, PHGG and EHGG) produced fecal total and dry matter outputs like CP and GG.

Figure 3:
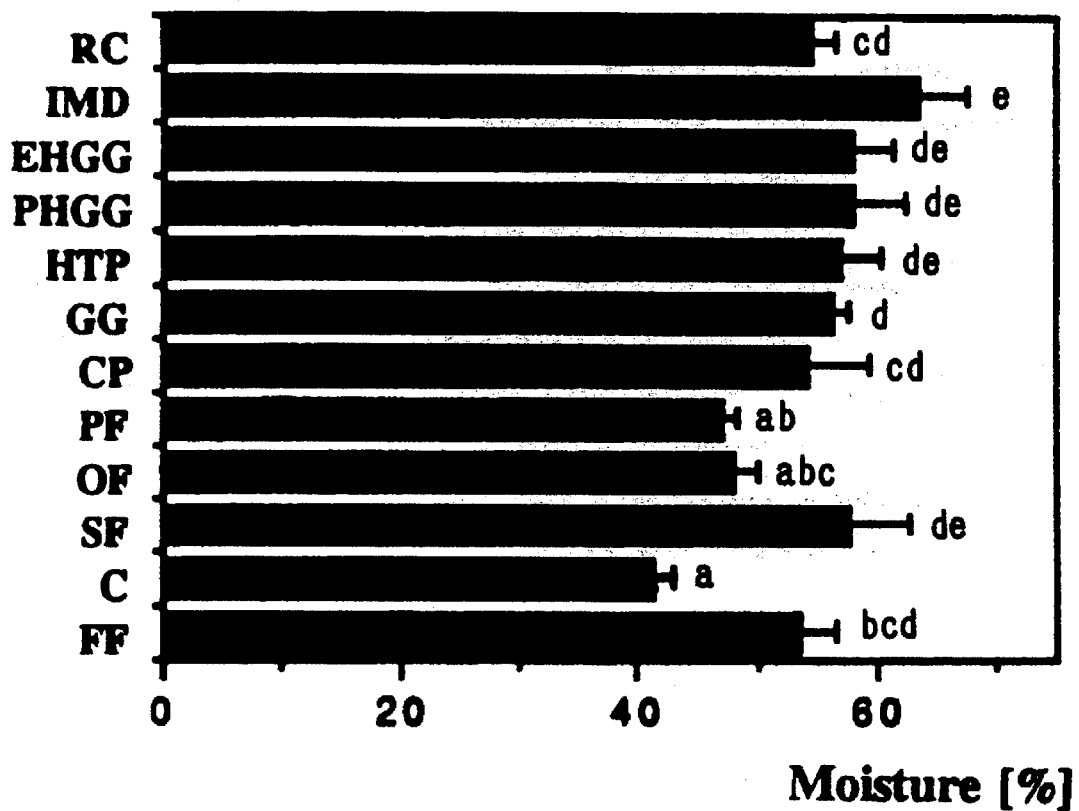
FIG. 3—Fecal moisture for Example 6. Means±standard deviations. Means with common letters are not statistically significantly different (ANOVA, Scheffe's F-test, P≦0.05).

Fecal Moisture Content. Fecal moisture contents (FIG. 3) were low for the insoluble, cellulose-rich fibers, C, OF and PF (41–48%). Higher fecal moisture contents were observed for SF, CP, GG, HTP, PHGG, EHGG and IMD. Fermentable fibers generally increase fecal moisture, presumably due to an increase in fecal bacterial mass (Palacio, J. C. et al., *Clinical Nutrition, Enteral and Tube Feeding*, 2nd Edition, W. B. Saunders Company, Philadelphia, 1990, Chapter 29, "Dietary Fiber's Physiologic Effects and Potential Applications to Enteral Nutrition", 556–574; Cummings, J. H. and Stephen, A. M., "The Role of Dietary Fibre in the Human Colon," *Can. Med. Assoc. Journal*, 123:1109–1114, 1980). Fecal moisture data supports that the hydrolyzed guar gums (PHGG, EHGG) and HPT are as fermentable as untreated GG and CP, since all of these fibers led to similar fecal moisture values (54–58%). IMD gave the highest fecal moisture contents (63%).

Transit Time. Results indicated no relationship between molecular weight or viscosity and effects on GI transit.

Intestinal Tissue Weights. Cecum weights (Table 5) were increased with GG and CP compared to FF, but the low viscosity derivatives, PHGG and EHGG, as well as IMD caused similar increases. HTP, SF and OF had a weaker effect, while C and PF did not increase cecum weights compared to FF.

Small intestinal weights were increased with CP and GG only. No significant differences in colon weights were observed (Table 5).

Conclusions. The results of this experiment support the following evaluation of fiber sources: a) fibers SF and OF as well as moderately hydrolyzed soluble fibers (HTP) showed bowel regulatory effects as exemplified by desirable fecal output, stool consistency and GI regularity, and b) extensively hydrolyzed soluble fibers (esp. EHGG) and indigestible maltodextrin (IMD) can cause GI intolerance, i.e., initial constipation followed by unusually soft stools.

TABLE 3

Body Weights and Food Intake

| Experimental Group | Mean Body Weights (g ± SD) | | Food Intake (g/d ± SD) | |
|---|---|---|---|---|
| | Initial | Final | Days 7–10 | Days 17–20 |
| Fiber-Free (FF) | 223 ± 8 | 227 ± 29 | 8.3 ± 2.1 | 9.8 ± 2.4 |
| Cellulose (C) | 223 ± 4 | 257 ± 38 | 10.4 ± 1.7 | 12.9 ± 3.7 |
| Soy Fiber (SF) | 221 ± 7 | 265 ± 21 | 10.9 ± 1.5 | 12.8 ± 2.6 |
| Oat Hull Fiber (OF) | 224 ± 7 | 262 ± 29 | 10.8 ± 2 | 13.3 ± 3.1 |
| Pea Fiber (PF) | 221 ± 6 | 252 ± 19 | 9.8 ± 1.4 | 11.1 ± 2.2 |
| Citrus Pectin (CP) | 222 ± 5 | 263 ± 38 | 10.7 ± 2.4 | 12.4 ± 2.9 |
| Guar Gum (GG) | 221 ± 8 | 250 ± 14 | 9.6 ± 2 | 11.2 ± 1.4 |
| Partially Hydrolyzed Pectin (HTP) | 223 ± 6 | 249 ± 27 | 9.5 ± 2.1 | 13.8 ± 2.3 |
| Part. H. Guar Gum (PHGG) | 222 ± 6 | 253 ± 21 | 8.6 ± 1.5 | 13 ± 2.3 |
| Ext. H. Guar Gum (EHGG) | 219 ± 6 | 237 ± 25 | 8.2 ± 1.9 | 10.3 ± 1.6 |
| Indig. Maltodextrin (IMD) | 222 ± 4 | 252 ± 32 | 7.4 ± 1.5 | 10.7 ± 2.8 |
| Rodent Chow (RC) | 219 ± 14 | 260 ± 28 | (not determined) | |
| Means: | 222 ± 7 | 252 ± 28 | 9.5 ± 2.1 | 11.9 ± 2.8 |
| | | Mean: | 10.7 ± 2.3 | |

TABLE 4

Stool Frequency and Consistency

| Experimental Group | Frequency days without feces of 220 days/group | Days With Feces (of 220 days/group) in Category; | | | | Mean Stool Consistency Score ± Std. Dev. |
|---|---|---|---|---|---|---|
| | | Normal (1) | Slightly soft (2) | Soft (3) | Unformed (4) | |
| FF | 2 | 218 | 0 | 0 | 0 | 1.00 ± 0[a] |
| C | 0 | 220 | 0 | 0 | 0 | 1.00 ± 0[a] |
| SF | 0 | 217 | 3 | 0 | 0 | 1.01 ± 0.02[a] |
| OF | 0 | 220 | 0 | 0 | 0 | 1.00 ± 0[a] |
| PF | 1 | 217 | 2 | 0 | 0 | 1.01 ± 0.02[a] |
| CP | 1 | 208 | 11 | 0 | 0 | 1.05 ± 0.06[a] |
| GG | 2 | 205 | 13 | 0 | 0 | 1.06 ± 0.06[a] |
| HTP | 2 | 214 | 4 | 0 | 0 | 1.02 ± 0.02[a] |
| PHGG | 13 | 201 | 5 | 0 | 1 | 1.04 ± 0.04[a] |
| EHGG | 32 | 178 | 18 | 7 | 1 | 1.21 ± 0.23[a] |
| IMD | 37 | 89 | 35 | 39 | 20 | 1.91 ± 0.63[b] |
| RC | 0 | 219 | 1 | 0 | 0 | 1.01 ± 0.01[a] |

[a,b]Means with different superscripts are significantly different (Scheffe F-test, $p \leq 0.001$).

TABLE 5

Intestinal Mass - Total and Dry Matter Weights

| Experimental Group | Total Weights (g/kg BW ± SD) | | | Dry Matter Weights (g/kg BW ± SD) | | |
|---|---|---|---|---|---|---|
| | Small Intestine | Cecum | Colon | Small Intestine | Cecum | Colon |
| FF | 24.3 ± 3.5$^a$ | 2.6 ± 0.4$^a$ | 3.7 ± 0.3$^{ab}$ | 4.83 ± 0.49$^a$ | 0.61 ± 0.08$^a$ | 0.93 ± 0.18$^a$ |
| C | 24.2 ± 3.5$^a$ | 2.4 ± 0.3$^a$ | 4.2 ± 0.7$^{ab}$ | 4.81 ± 0.78$^a$ | 0.61 ± 0.09$^a$ | 0.99 ± 0.17$^a$ |
| SF | 22.4 ± 2.7$^a$ | 3.2 ± 0.3$^{ab}$ | 4.1 ± 0.6$^{ab}$ | 4.4 ± 0.47$^a$ | 0.74 ± 0.09$^{abc}$ | 0.98 ± 0.15$^a$ |
| OF | 23.7 ± 3$^a$ | 2.7 ± 0.4$^a$ | 4 ± 0.5$^{ab}$ | 4.56 ± 0.51$^a$ | 0.67 ± 0.13$^{ab}$ | 0.92 ± 0.17$^a$ |
| PF | 24.2 ± 2.3$^a$ | 2.5 ± 0.2$^a$ | 3.7 ± 0.3$^{ab}$ | 4.52 ± 0.54$^a$ | 0.58 ± 0.05$^a$ | 0.85 ± 0.06$^a$ |
| CP | 35.5 ± 5.5$^b$ | 4.2 ± 0.6$^{bc}$ | 4.3 ± 0.4$^{ab}$ | 6.45 ± 0.76$^b$ | 0.89 ± 0.14$^{bcd}$ | 1 ± 0.17$^a$ |
| GG | 35.2 ± 4.9$^b$ | 4.6 ± 0.6$^c$ | 4.6 ± 0.4$^{ab}$ | 6.37 ± 0.68$^b$ | 0.93 ± 0.11$^{bcd}$ | 1.02 ± 0.11$^a$ |
| HTP | 21.7 ± 3.7$^a$ | 3.2 ± 0.4$^{ab}$ | 3.5 ± 0.3$^a$ | 4.19 ± 0.46$^a$ | 0.73 ± 0.11$^{abc}$ | 0.84 ± 0.1$^a$ |
| PHGG | 22.9 ± 2.2$^a$ | 4.1 ± 0.6$^{bc}$ | 4.1 ± 0.5$^{ab}$ | 4.43 ± 0.41$^a$ | 0.91 ± 0.11$^{bcd}$ | 0.95 ± 0.16$^a$ |
| EHGG | 25.5 ± 2.1$^a$ | 4.7 ± 0.8$^c$ | 4.3 ± 0.7$^{ab}$ | 4.9 ± 0.35$^a$ | 0.99 ± 0.12$^{cd}$ | 0.93 ± 0.13$^a$ |
| IMD | 23.6 ± 3.8$^a$ | 5.2 ± 1.3$^c$ | 4.4 ± 1$^{ab}$ | 4.41 ± 0.95$^a$ | 1.06 ± 0.28$^d$ | 0.93 ± 0.24$^a$ |
| RC | 23.8 ± 2.2$^a$ | 3.3 ± 0.5$^{ab}$ | 4.8 ± 0.5$^b$ | 4.29 ± 0.26$^a$ | 0.71 ± 0.1$^{ab}$ | 1.03 ± 0.15$^a$ |

$^{a,b,c,d}$Means with common superscripts are not significantly different (one-way ANOVA, Scheffe's F-test, $p \leq 0.05$)

EXAMPLE 7

Protocol

Animal Care

One-hundred-twenty male cecectomized Crl:CD®BR Sprague-Dawley rats (279–300 g, approx. 60–65 days old) were obtained at approximately 5–7 days post-surgery from Charles River Laboratories, Portage, Mich. Rats were obtained and maintained in a controlled environment during all parts of this study at 22°–24° C. and 40–50% relative humidity on a 12-hour reversed light/dark cycle (dark from 6:30 am until 6:30 pm).

Upon receipt, rats were weighed and housed individually in standard wire-bottom stainless steel cages. During a 2-day pretest period (days -1 and 0), rodent laboratory chow and water were provided ad libitum.

Dietary Treatments

After the pretest period (i.e. day 1 of the study) rats were weighed, randomized and assigned by body weight to 12 dietary treatment groups, 10 rats per group. All animals received liquid diets based on Isocal HN enteral formula (Mead Johnson Enteral Nutritionals, Evansville, Ind., U.S.A.) diluted with water 1:1, (composition shown in Table 6) for 10 days ad libitum. Fiber sources were included in the experimental diets at a level of 1% (w/v). Fiber contents were confirmed using the AOAC method (Lee, S. et al., "Determination of Total, Soluble and Insoluble Dietary Fiber in Foods—Enzymatic-Gravimetric Method, MES-TRIS Buffer: Collaborative Study," *J.A.O A C. Int* 75:395–416, 1992). As fiber sources, diets 1–3 contained pectin and hydrolyzed pectins, diet 4 contained equal amounts of oat hull fiber and hydrolyzed pectin, diet 5 contained oat hull fiber, diets 6–10 contained guar gum and hydrolyzed guar gums, and diet 11 contained soy fiber. Diet 12 served as a fiber-free control diet. Dietary treatment groups and fiber molecular weight profiles are described further in Table 7. The hydrolyzed pectins and some of the hydrolyzed guar gums were prepared according to the procedures described in Example 3.

Measurements

Bowel function was evaluated using the following four measurements: 1) fecal moisture, 2) total fecal output, stool consistency, and 4) gastrointestinal transit time. Food intake was recorded on days 6–7 and 8–9, and body weights were measured on days 1, 5, and 10. Daily fecal collections were made for each animal on days 5–10, stored at −20° C., and then freeze-dried and weighed. On days 1, 5 and 10, feces were collected fresh (manual expression) from each animal, immediately weighed, then freeze-dried and weighed again, to determine fecal moisture. The same fecal sample obtained by manual expression on days 1, 5 and 10 was used to assess stool consistency. An automated texture analyzer (TA-XT2, Texture Technologies Corp.) was used to determine the force necessary to compress a fecal sample to 50% of its original height. Total fecal output (wet weight) from day 5 to 10 was calculated using percent moisture (mean of days 6 and 10) and fecal dry weights.

Gastrointestinal transit time was determined on days 5–10 using chromium(III)oxide as a nonabsorbable marker as described by Otsuka, et al. (Otsuka, M., et al., "Influence of Meal Distribution of Wheat Bran on Fecal Bulk, Gastrointestinal Transit Time and Colonic Thymidine Kinase Activity in the Rat," *J. Nutr.*, 119:566–572, 1989). On day 5, 15 mg chromium(III)oxide was administered to each rat by oral gavage. Feces were collected for the following 120 hours. Collected feces were freeze-dried, weighed, ashed and analyzed by atomic absorption spectrophotometry for chromium. Cumulative fecal chromium excretion at 120 hours post chromium marker gavage (in percent of chromium administered) was used as a measure of gastrointestinal transit.

On day 10 all animals were euthanatized by $CO_2$ asphyxiation.

Results and Discussion

Abbreviations for dietary treatment groups are as follows: pectin (P), hydrolyzed pectin A (HP-A), hydrolyzed pectin B (HP-B), 50% oat hull fiber/50% HP-A (OF/HP-A), oat hull fiber (OF), guar gum (GG), hydrolyzed guar gums A through D (HGG-A through -D), soy polysaccharide (SP), and fiber-free (FF).

Analysis of soluble, insoluble and total dietary fiber contents of the fiber sources used in this study (Table 8) indicated that total dietary fiber (TDF) contents of the fiber sources were reasonably close to the expected 70–90% TDF, with the exception of HP-B (54.4% TDF). The lower TDF content of HP-B could be ascribed to a high fraction of low-molecular weight oligosaccharides that generally remain undetected by the assay, but may well be dietary fiber according to its physiological definition.

Also shown in Table 8 are viscosity measurements of each dietary fiber source in 1% aqueous solutions. Hydrolysis of P and GG significantly decreased their viscosity. Guar gum (GG) described in Table 7 as No. 6 was of unusually low viscosity (approx. 45 cps) compared to common guar gums (typically 1,000–4,000 cps). This GG was selected because it would have been impossible to formulate liquid diets with common high-viscosity guar gums at the 1% level.

Mean body weights, body weight gains and food intake values are shown in Table 9. Mean body weight of the SP group at day 5 was lower than other groups, because during the first 3 days of the study, SP repeatedly caused clogging of sipper tubes, leading to decreased food intake (not measured). Beginning on day 3, feeding bottles were shaken approximately every 8 hours to prevent clogging, and all animals rapidly regained weight thereafter. Mean body weights at day 10 were not significantly different.

Animals fed hydrolyzed HGG-A showed the smallest body weight gains and lowest food intakes.

Calculated daily dietary fiber intakes (Table 10) ranged from 0.68 (HP-B) to 1.16 g (OF). Diets provided between 10.6 (HP-B) and 16.9 (OF) grams of dietary fiber per 1000 calories (Table 10). These fiber contents are similar to those of commercially available enteral nutrition formulas with fiber, e.g., Ultracal enteral formula (Mead Johnson Nutritional Group, Evansville, Ind.) and Jevity enteral formula (Ross Laboratories, Columbus, Ohio): 13.6 g/1000 Cal, and Ensure with Fiber enteral formula (Ross Laboratories): 13.1 g/1000 Cal.

Figure 4:
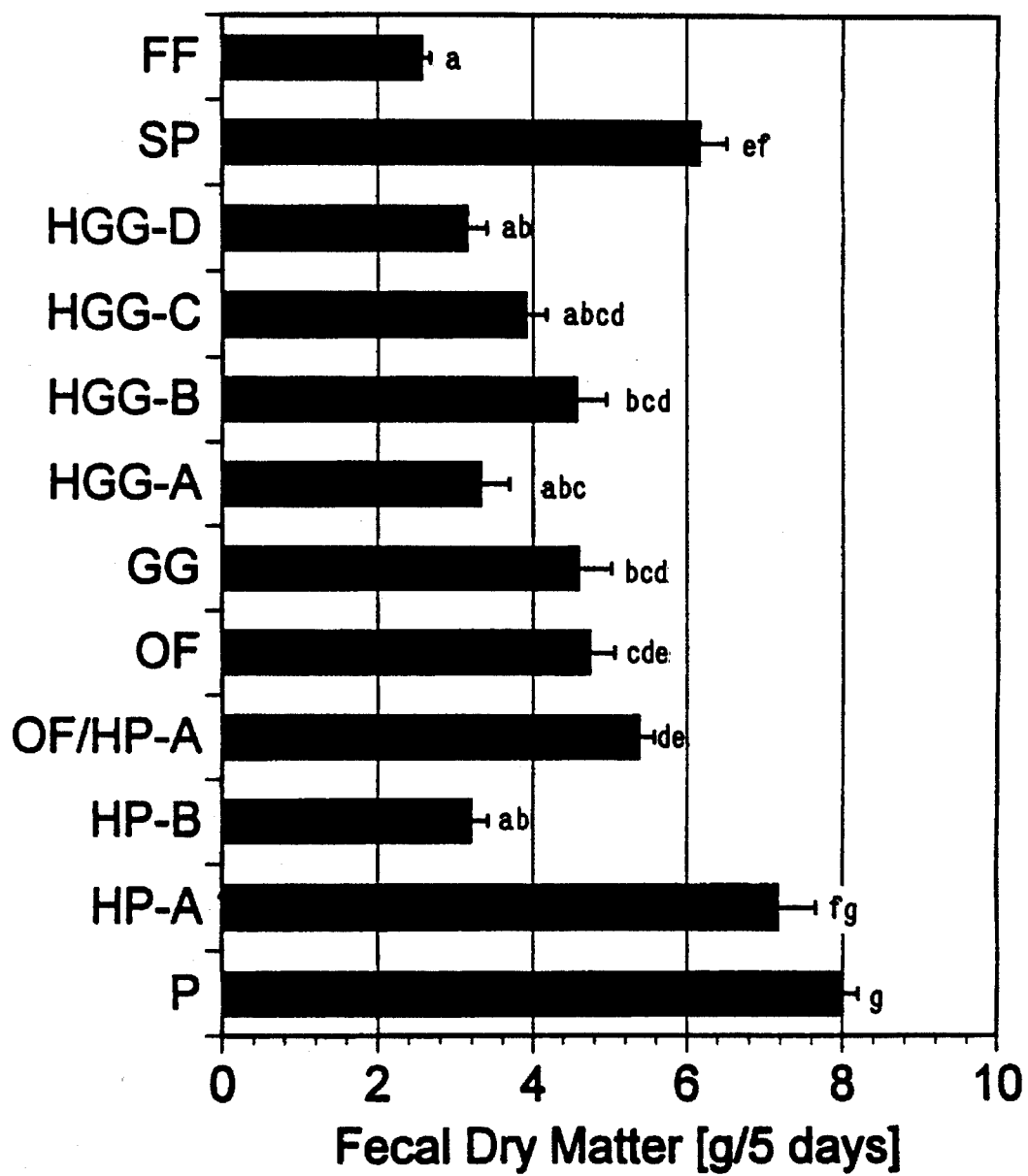
FIG. 4—Fecal dry matter output for Example 7. Means±standard deviations. Means with common letters are FIG. 5—Fecal moisture for Example 7. Means±standard deviations. Means with common letters are not statistically significantly different (ANOVA, Tukey's test. p≦0.05).

Mean fecal dry matter outputs, measured during the 5-day metabolic period (FIG. 4), were highest for P (7.9 g/5 days), HP-A (7.2 g/5 days), and SP (6.2 g/5 days), and lowest for FF (2.6 g/5 days), HP-B (3.2 g/5 days), HGG-A (3.3 g/5 days), HGG-C (3.9 g/5 days) and HGG-D (3.2 g/5 days).

Figure 5:
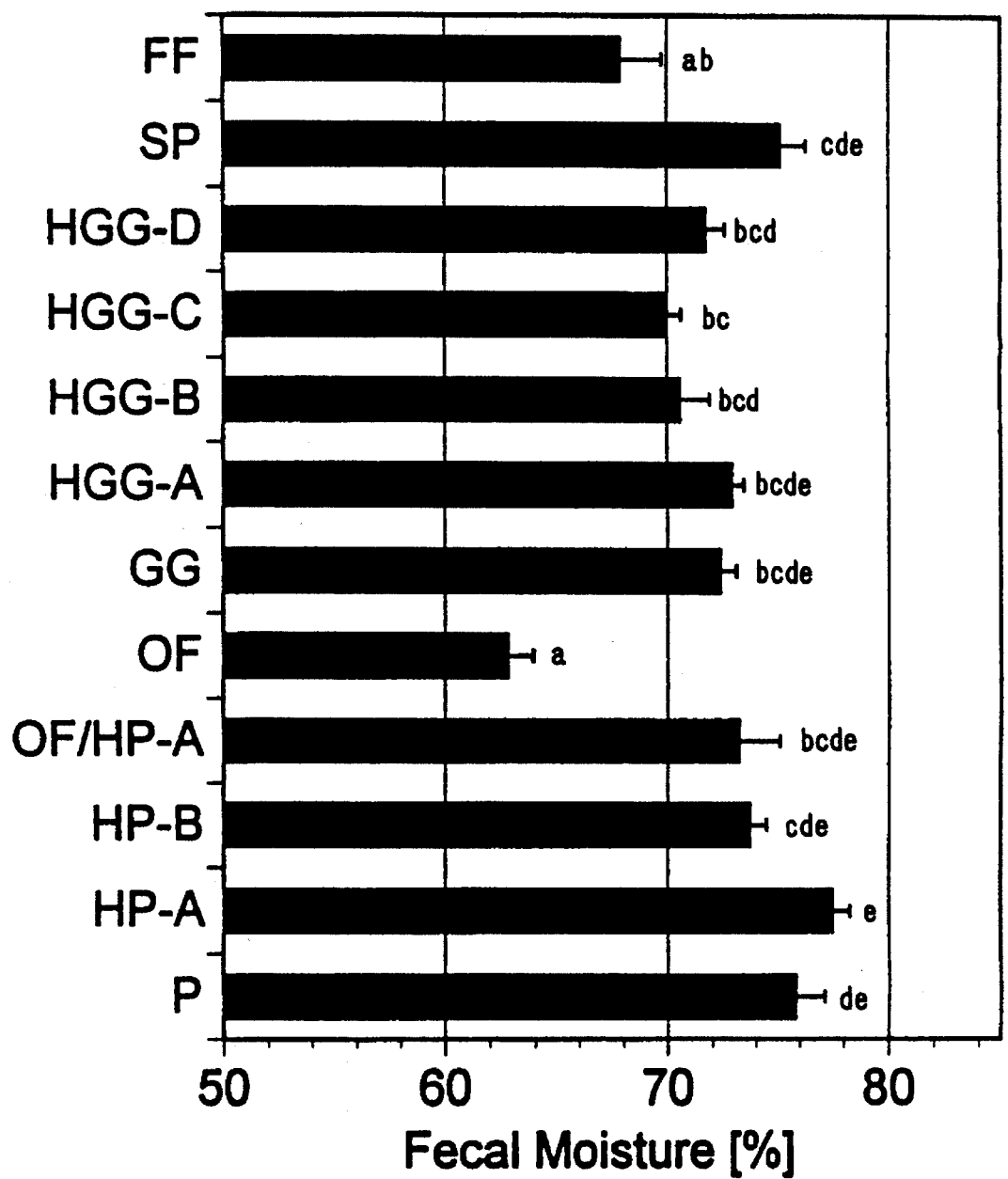

Mean fecal moisture contents, measured on days 5 and 10 (FIG. 5), were highest for HP-A and P (77.5 and 75.8%, respectively), and lowest for OF and FF (62.8 and 67.9%, respectively). In contrast to OF, OF/HP-A gave rise to significantly higher fecal moisture (73.2%).

Figure 6:
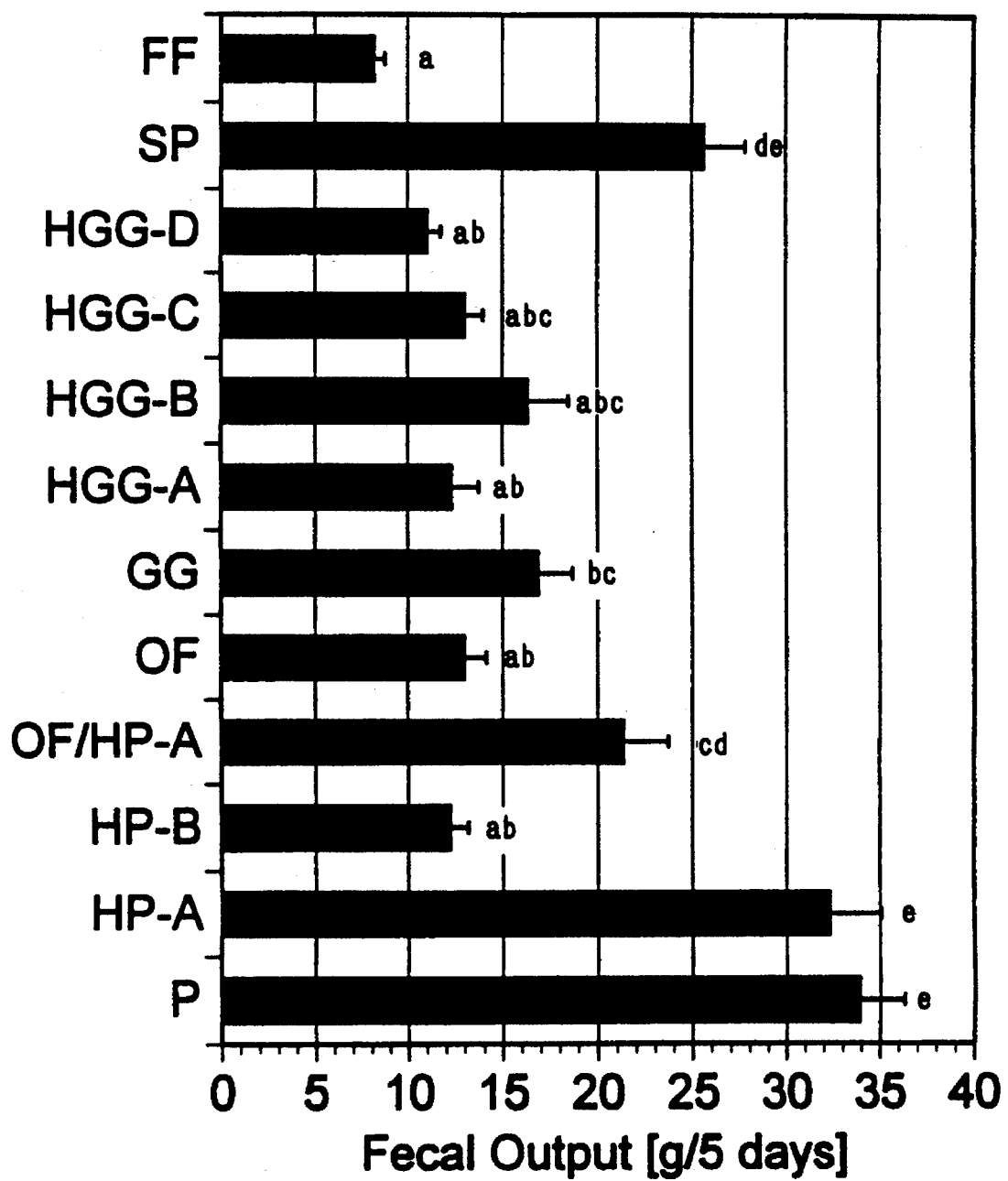
FIG. 6—Fecal output for Example 7. Means±standard deviations. Means with common letters are not statistically significantly different (ANOVA, Tukey's test, p≦0.05).

Calculated total fecal output (FIG. 6) was significantly higher for P and HP-A (33.9 and 32.3 g/5 days, respectively) compared to most other treatments. As expected, the lowest total fecal output was observed for FF (8.2 g/5 days). Fecal outputs of HP-B, OF and all HGGs (HGG-A-D) were low (11.0–16.4 g/5 days) and not significantly different from FF. SP and OF/HP-A caused fecal outputs of 25.6 and 21.3 g/5 days, respectively.

Assessment of stool consistency is a key measurement for studies involving dietary fibers. In this study, stool consistency was assessed by measuring the force required to compress a manually expressed fecal sample to 50% of its original height. In general, fecal samples with readings above approximately 100 g appeared as well formed pellets, typical for cecectomized and non-cecectomized rats fed commercial rodent chow (e.g. Ralston-Purina rodent chow). Samples with readings between approximately 50 and 100 g appeared soft but formed, and samples with readings below approximately 50 g were unformed or liquid in appearance.

Figure 7:
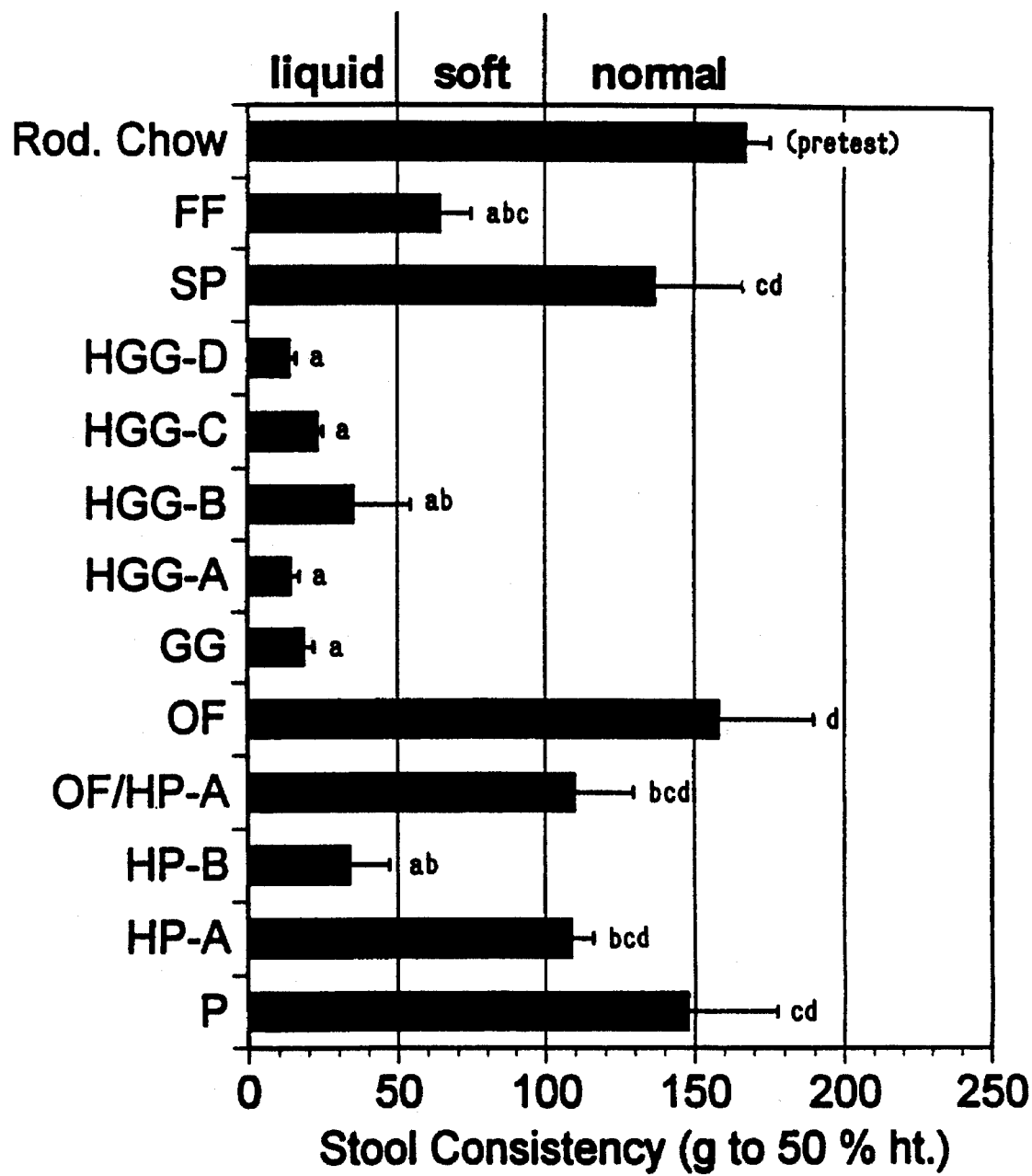
FIG. 7—Stool consistency for Example 7. Means±standard deviations. Means with common letters are not statistically significantly different (ANOVA, Tukey's test, p≦0.05).

Mean stool consistency readings, measured on days 5 and 10 (FIG. 7), were above 100 g (normal) for P (148 g), HP-A (109 g), OF/HP-A (110 g), OF (158 g) and SP (137 g). In contrast, stools from animals fed HP-B (34 g) and all five guar gums (GG, HGG-A-D: 13.7-35 g) were unformed or liquid. FF gave rise to soft stools (64 g), and during the pretest period all animals (fed rodent chow) produced normal, formed stools (167 g, n=120).

Gastrointestinal transit (FIG. 8) was fastest in animals fed HP-A, who excreted 70.4% of the administered chromium within 120 hours, followed by P and OF/HP-A (51.1% and 50.7%, respectively). Animals fed HP-B and SP had slower and similar gastrointestinal transits (29.7% and 26.7%, respectively), and OF, FF and all five guar gums showed very slow gastrointestinal transit (2.9–5.3%).

Figure 8:
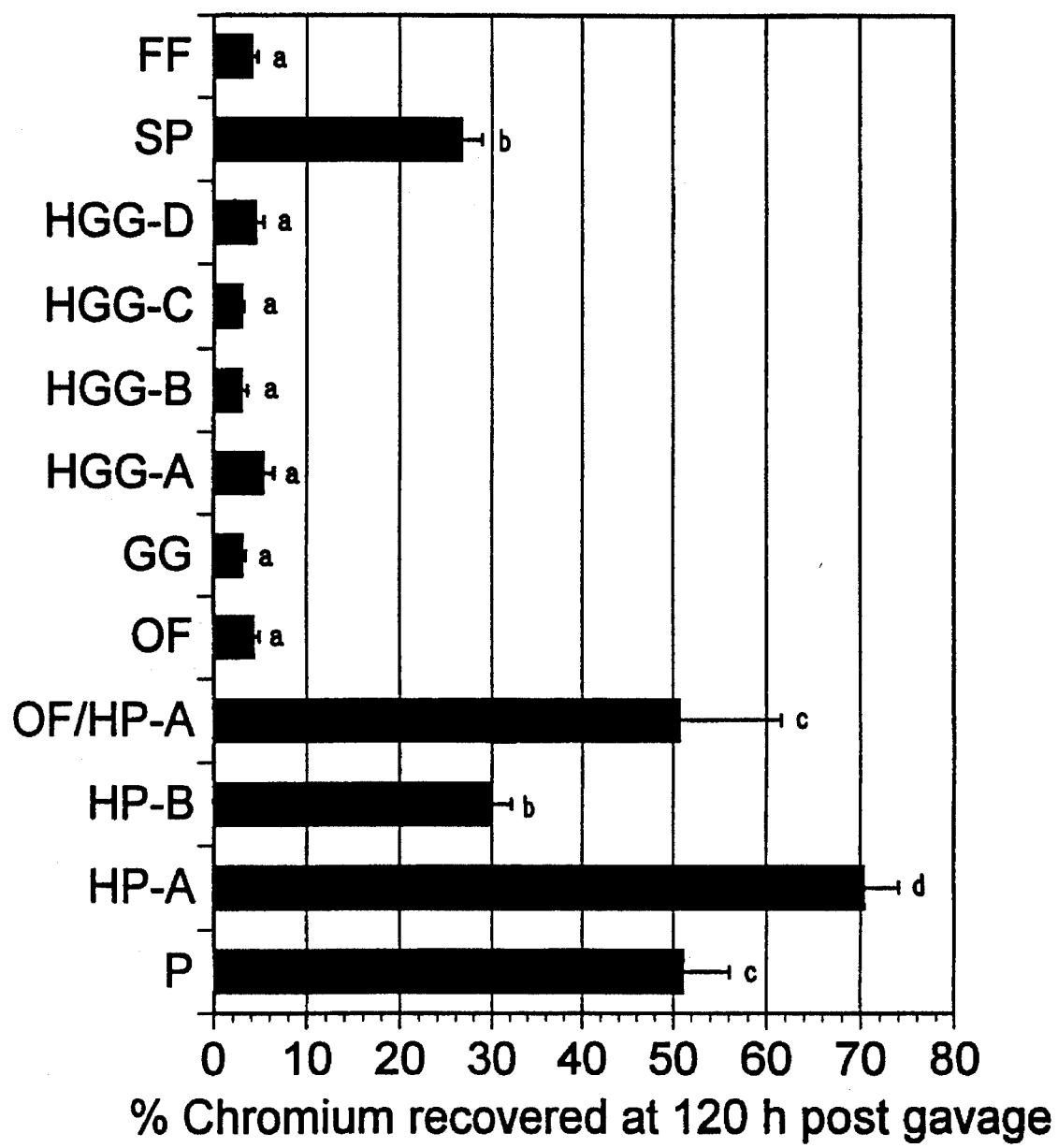
FIG. 8—Gastrointestinal transit for Example 7. Means±standard deviations. Means with common letters are not statistically significantly different (ANOVA, Tukey's test, p≦0.05).

For pectin, there appears to be a relationship between degree of hydrolysis (as defined by molecular weight and viscosity) and observed bowel regulatory effects. Moderate hydrolysis of pectin to a peak molecular weight of 16.7 kd (HP-A) did not significantly diminish the favorable bowel regulatory effects observed with unmodified pectin (P). Both P and HP-A fed animals showed high fecal outputs (FIGS. 4, 5, and 6) of normal consistency (FIG. 7) and fast gastrointestinal transit rate (FIG. 8). These parameters are either similar or better than those observed for SP, which is the most commonly used fiber source in enteral nutrition products. Further hydrolysis of pectin down to a peak molecular weight of 3.3 kd (HP-B) diminished or abolished the bowel regulatory effects observed with P or HP-A. Fecal output with HP-B resembled FF (FIGS. 4 and 6), stool consistency was liquid or unformed (FIG. 7) and gastrointestinal transit was significantly slower than that of P or HP-A.

In contrast to pectins, guar gums did not exhibit a relationship between degree of hydrolysis and effects on bowel function. All guar gum treatments resulted in similarly low fecal outputs (FIGS. 4 and 6), liquid stool consistencies (FIG. 7) and slow gastrointestinal transit (FIG. 8). A common, high viscosity guar gum would probably have shown beneficial bowel regulatory effects, as was observed in Example 6.

The reasons for differences between pectins and guar gums are not entirely clear, since both are highly fermentable and completely water-soluble dietary fibers. However, if colonic microbial fiber fermentation is viewed as a two-step process—polysaccharide hydrolysis followed by mono- or oligosaccharide fermentation—, then high rates of polysaccharide hydrolysis exceeding rates of mono-or oligosaccharide fermentation could lead to an accumulation of osmotically active monosaccharides in the colon, which then may induce osmotic diarrhea. According to this hypothesis, guar gums and extensively hydrolyzed pectin (HP-B) may have been hydrolyzed too rapidly by the microflora, and thus caused osmotic diarrhea, while P and HP-A may have been hydrolyzed slowly enough to prevent an accumulation of fermentable mono- and oligosaccharides within the colon.

A 1:1 combination of OF and HP-A had similar desirable effects on bowel function as HP-A alone, i.e. similar fecal moisture (FIG. 5) and stool consistency (FIG. 7), although somewhat lower fecal output (FIGS. 4 and 6) and slower gastrointestinal transit (FIG. 8). Thus, these results indicate that combinations of moderately hydrolyzed pectin, such as HP-A, and predominantly insoluble, non-fermentable dietary fibers are useful in improving gastrointestinal function in enteral nutrition.

OF by itself caused low fecal moisture content (FIG. 5) and fecal output (FIG. 6), as well as normal stool consistency (FIG. 7) and slow gastrointestinal transit (FIG. 8), indicating that OF, a predominantly non-fermentable fiber, may also be an effective fiber source in the management of liquid diet-associated diarrhea.

This study supports the clinical relevance of the cecectomized rat model for liquid formula nutrition. The animals were fed enteral diets with fiber contents closely approximating levels used in commercial enteral nutrition formulas (Table 10). Fecal moisture contents of cecectomized rats and humans on formula diets are very similar, e g. 65–80% (Heymsfield, S. B., et al., "Fiber Supplementation of Enteral Formulas: Effects on the Bioavailability of Major Nutrients and Gastrointestinal Tolerance", *J. Parent. Ent. Nutr.*, 12:265–273, 1988), whereas fecal moisture contents of conventional rats are generally lower, e.g. 40–60%. A study in healthy volunteers showed that feeding enteral formula containing 1% pectin completely reversed a high incidence of diarrhea (60%) induced by fiber-free enteral formula feeding (Zimmaro, et al., "Isotonic Tube Feeding Formula Induces Liquid Stool in Normal Subjects: Reversed by Pectin", *J. Parenter. Ent. Nutr.*, 13:117–123, 1989). Similar effects were also observed in the present study using P as well as HP-A compared to FF. Results of this study also agree with a study in healthy volunteers by Lampe, et al., (Lampe, et al., "Gastrointestinal Effects of Modified Guar Gum and Soy Polysaccharide as Part of an Enteral Formula Diet", *J. Parent. Ent. Nutr.*, 16:538–544, 1992) who could not demonstrate beneficial bowel regulatory effects using Sunfiber/Benefiber (HGG-D) when compared to fiber-free diet. Lampe, et al., also observed slow gastrointestinal transit with HGG-D, similar to fiber-free, and significantly faster transit with soy polysaccharide.

TABLE 6

Composition of Liquid Basal Diet
Isocal NH Enteral Formula Diluted With Water 1:1 (v/v)

| Nutrient | per 100 ml[1] | per kg Dry Matter[2] | % of Rat's Requirement[3] |
|---|---|---|---|
| Calories, Cal | 53 | 4800 | 126 |
| Protein, g | 2.2 | 200 | 167 |
| Fat, g | 2.3 | 200 | 400 |
| Carbohydate, g | 6.2 | 560 | — |
| Water, g | 92 | — | — |
| Vitamin A, IU | 210 | 19100 | 480 |
| Vitamin D, IU | 17 | 1500 | 155 |
| Vitamin E, IU | 3.2 | 290 | 970 |
| Vitamin K, µg | 5.3 | 480 | 960 |
| Folic Acid, µg | 17 | 1550 | 155 |
| Thiamin, mg | 0.16 | 14.5 | 360 |
| Riboflavin, mg | 0.18 | 16.4 | 550 |
| Niacin, mg | 2.1 | 191 | 960 |
| Vitamin $B_6$, mg | 0.21 | 19.1 | 320 |
| Vitamin $B_{12}$, µg | 0.64 | 58 | 116 |
| Biotin, µg | 12.5 | 1140 | — |
| Pantothenic acid, mg | 1.05 | 95 | 1190 |
| Choline, mg | 21 | 1910 | 191 |

TABLE 6-continued

Composition of Liquid Basal Diet
Isocal NH Enteral Formula Diluted With Water 1:1 (v/v)

| Nutrient | per 100 ml[1] | per kg Dry Matter[2] | % of Rat's Requirement[3] |
|---|---|---|---|
| Vitamin C, mg | 12.5 | 1140 | — |
| Calcium, mg | 43 | 5400 | 78* |
| Phosphorus, mg | 43 | 4600 | 115 |
| Iodine, µg | 6.4 | 580 | 390 |
| Iron, mg | 0.76 | 69 | 200 |
| Magnesium, mg | 17 | 1550 | 390 |
| Copper, mg | 0.09 | 7.7 | 154 |
| Zinc, mg | 0.85 | 77 | 640 |
| Manganese, mg | 0.13 | 61 | 24* |
| Sodium, mg | 47 | 4200 | 840 |
| Potassium, mg | 81 | 7300 | 200 |
| Chloride, mg | 72 | 6500 | 1300 |
| Selenium, µg | 4.3 | 390 | 390 |
| Chromium, µg | 4.3 | 390 | 130 |
| Molybdenum, µg | 10.5 | 950 | — |

1. From Product Handbook, Mead Johnson Enteral Nutritionals, 7/91.
2. 11 g solids per 100 g liquid formula. Per kg dry matter = per 100 ml × 1000/(100 × 0.11).
3. NAS/NRC: Recommended Nutrient Allowances for Domestic animals, No. 10, Nutrient Requirements of Laboratory Animals, 3rd Ed., 1978 (NAS/NRC requirements are specified in per kg diet).
*The level of this nutrient in the diet is below the recommended allowance. It was decided not to formulate a special diet to increase the level of this nutrient because the short duration of the feeding period (10 days) and indications that the rat's requirement may be met by the present levels.

TABLE 7

Dietary Treatment Fibers and Molecular Weight Data

| | | Major Molecular Weight Peaks (in kd)* | | | | |
|---|---|---|---|---|---|---|
| | | First Peak | | | Second Peak | | |
| No. | Dietary Treatment Groups | Start | Maximum | End | Start | Maximum | End |
| 1. | Citrus Pectin, not hydrolyzed, P (Genu HM sugarless, Hercules) | 1 | 800 | ~7500 | n/a** | n/a | n/a |
| 2. | Hydrolyzed Pectin-A, HP-A | 0.7 | 16.7 | ~2200 | n/a | n/a | n/a |
| 3. | Hydrolyzed Pectin-B, HP-B | 0.9 | 3.3 | ~1590 | n/a | n/a | n/a |
| 4. | 50% Oat Hull Fiber, 50% Hydrolyzed Pectin-A | 0.7 | 16.7 | ~2200 | n/a | n/a | n/a |
| 5. | Oat Hull Fiber, OF (Snowite, Canadian Harvest) | (no data available, since insoluble in water; but high MW) | | | | | |
| 6. | Guar Gum, low viscosity, GG (Procol B2, Polypro) | 0.2 | 0.5 | 0.9 | 2 | 2000 | ~13,400 |
| 7. | Hydrolyzed Guar Gum, HGG-A, (100C, Polypro) | 2 | 23 | 390 | 390 | ~3400 | ~10,700 |
| 8. | Hydrolyzed Guar Gum-B, HGG-B | 0.2 | 0.6 | 0.8 | 0.8 | 4.6 | ~6,500 |
| 9. | HydrolVzed Guar Gum-C, HGG-C | 0.2 | 0.5 | 0.8 | 0.8 | 2.1 | ~2,500 |
| 10. | Hydrolyzed Guar Gum-D, HGG-D (Sunfiber/Benefiber, Sandoz) | 0.1 | 0.2 | 0.9 | 0.9 | 9 | 280 |
| 11. | Soy Polysaccharide, SP (Fibrim, Protein Technologies, Int.) | (no data available, since insoluble in water; but high MW) | | | | | |
| 12. | Fiber-Free Control, FF | n/a | n/a | n/a | n/a | n/a | n/a |

*Molecular weight peaks as determined by procedure described in Example 5. Molecular weights above 2,000 kd were based on extrapolation of the dextran standard curve. For the guar gums, the second peak was the predominant peak.

TABLE 8

Fiber Sources - Dietary Fiber Content and Viscosity

| No. | Fiber Source | Percent Dietary Fiber[1] | | | Viscosity[2] |
|---|---|---|---|---|---|
| | | Soluble | Insoluble | Total | (cps at 1%) |
| 1 | Pectin | 72.1 | <2.0 | 72.1 | 16.64 |
| 2 | Hydrolyzed Pectin A | 66.4 | <2.0 | 66.4 | 1.80 |
| 3 | Hydrolyzed Pectin B | 54.4 | <2.0 | 54.4 | 1.27 |
| 4 | Oat Hull Fiber/Hydrolyzed Pectin A | 35.4 | 42.6 | 78.0 | 1.41 |
| 5 | Oat Hull Fiber | 4.3 | 85.2 | 89.5 | 1.12 |
| 6 | Guar Gum, low viscosity | 71.4 | <2.0 | 71.4 | 44.55 |
| 7 | Hydrolyzed Guar Gum A | 78.7 | 3.9 | 82.6 | 69.75 |
| 8 | Hydrolyzed Guar Gum B | 73.4 | 3.9 | 77.3 | 3.63 |
| 9 | Hydrolyzed Guar Gum C | 68.1 | 3.8 | 71.9 | 2.04 |
| 10 | Hydrolyzed Guar Gum D | 71.8 | <2.0 | 71.8 | 1.25 |
| 11 | Soy Polysaccharide | 5.8 | 66.5 | 72.3 | 1.39 |

[1]Dietary Fiber Analysis performed according to: Lee, S., Prosky, L., and DeVries, J., "Determination of Total, Soluble and Insoluble Dietary Fiber in Foods--Enzymatic-gravimetric Method, MES-TRIS Buffer: Collaborative Study", J.A.O.A.C. Int., 75:395–416, 1992.
[2]Viscosity determined with 1% (w/v) aqueous solutions of fiber source using Brookfield viscometer.

TABLE 9

Body Weights and Food Intake (Means ± SEM)

| No. | Dietary Treatment | Body Weight (g) | | | Weight Gain (g) | Food Intake (ml/d) | |
|---|---|---|---|---|---|---|---|
| | | Day 1 | Day 5 | Day 1 | Days 1–10 | Days 6–7 | Days 8–9 |
| 1 | Pectin | 301 ± 5.0[a] | 313 ± 4.2[b] | 332 ± 3.8[a] | 30.8 ± 4.5[ab] | 124 ± 9.8[ab] | 142 ± 5.6[b] |
| 2 | Hydrolyzed Pectin A | 305 ± 5.9[a] | 323 ± 6.2[b] | 338 ± 10.6[a] | 33.4 ± 10.7[ab] | 138 ± 6.7[b] | 129 ± 7.8[ab] |
| 3 | Hydrolyzed Pectin B | 301 ± 3.5[a] | 308 ± 5.9[ab] | 327 ± 5.5[a] | 25.5 ± 4.3[ab] | 130 ± 6.9[ab] | 119 ± 4.4[ab] |
| 4 | Oat Hull Fiber/ Hydrolyzed Pectin A | 303 ± 4.3[a] | 321 ± 4.8[b] | 348 ± 4.5[a] | 44.8 ± 2.8[b] | 139 ± 4.3[b] | 138 ± 4.4[ab] |
| 5 | Oat Hull Fiber | 303 ± 3.7[a] | 312 ± 3.9[b] | 339 ± 6.0[a] | 35.8 ± 5.1[ab] | 141 ± 9.8[ab] | 118 ± 12.2[ab] |
| 6 | Guar Gum, low viscosity | 303 ± 6.1[a] | 310 ± 5.1[ab] | 331 ± 6.6[a] | 28.6 ± 2.8[ab] | 128 ± 3.8[ab] | 120 ± 5.6[ab] |
| 7 | Hydrolzyed Guar Gum A | 300 ± 5.3[a] | 299 ± 4.4[ab] | 316 ± 7.2[a] | 17.3 ± 6.3[a] | 104 ± 6.7[a] | 100 ± 7.9[a] |
| 8 | Hydrolyzed Guar Gum B | 297 ± 3.8[a] | 307 ± 3.9[ab] | 336 ± 4.0[a] | 39.3 ± 4.3[ab] | 133 ± 7.8[ab] | 133 ± 6.3[b] |
| 9 | Hydrolyzed Guar Gum C | 297 ± 5.9[a] | 307 ± 6.6[ab] | 337 ± 6.2[a] | 39.3 ± 5.2[ab] | 131 ± 7.4[ab] | 129 ± 4.9[ab] |
| 10 | Hydrolyzed Guar Gum D | 306 ± 6.9[a] | 315 ± 5.7[b] | 337 ± 4.8[a] | 30.2 ± 5.6[ab] | 123 ± 8.2[ab] | 120 ± 5.6[ab] |
| 11 | Soy Polysaccharide | 310 ± 5.1[a] | 286 ± 6.0[a] | 336 ± 4.5[a] | 25.5 ± 3.9[ab] | 149 ± 5.6[b] | 137 ± 7.5[b] |
| 12 | Fiber-Free | 298 ± 4.7[a] | 306 ± 7.0[ab] | 328 ± 4.7[a] | 30.1 ± 3.3[ab] | 132 ± 5.1[ab] | 130 ± 4.1[ab] |

[a,b]Means with different superscripts between dietary treatments are significantly different (ANOVA, Tukey's test, $p \leq 0.05$).

TABLE 10

Daily Intakes of Dietary Fiber (Calculated)

| No. | Fiber Source | Mean Dietary Fiber Intake[1] | |
|---|---|---|---|
| | | g/day | g/1000 Cal |
| 1 | Pectin | 0.96 | 13.6 |
| 2 | Hydrolyzed Pectin A | 0.89 | 12.5 |
| 3 | Hydrolyzed Pectin B | 0.68 | 10.6 |
| 4 | Oat Hull Fiber/ Hydrol. Pectin A | 1.08 | 14.7 |
| 5 | Oat Hull Fiber | 1.16 | 16.9 |
| 6 | Guar Gum, low viscosity | 0.89 | 13.5 |
| 7 | Hydrolyzed Guar Gum A | 0.84 | 15.6 |
| 8 | Hydrolyzed Guar Gum B | 1.03 | 14.6 |
| 9 | Hydrolyzed Guar Gum C | 0.93 | 13.6 |
| 10 | Hydrolyzed Guar Gum D | 0.87 | 13.5 |
| 11 | Soy Polysaccharide | 0.95 | 13.6 |

[1]Dietary fiber intakes were calculated from the mean of food intake group means on days 6–7 and 8–9 (Table 9) and total dietary fiber contents of fiber sources (Table 8). Dietary fiber sources were included in test diets at 1% (w/v). All diets contained approximately 53 Cal/100 ml.

We claim:

1. A nutritionally complete composition comprising (a) nitrogen source, (b) a non-fiber carbohydrate source, (c) a lipid source, (d) vitamins and minerals, and (e) a fiber system comprising partially hydrolyzed pectin having a peak molecular weight less than unmodified pectin and greater than 3,300.

2. The nutritional composition of claim 1 wherein said partially hydrolyzed pectin has a peak molecular weight of 8,000 or greater.

3. The nutritional composition of claim 1 wherein said partially hydrolyzed pectin has a peak molecular weight of between 8,000 and 500,000.

4. The nutritional composition of claim 1 wherein said partially hydrolyzed pectin has a peak molecular weight of between 10,000 and 200,000.

5. The nutritional composition of claim 1 wherein said partially hydrolyzed pectin has a peak molecular weight of between 15,000 and 100,000.

6. The nutritional composition of claim 1 wherein said partially hydrolyzed pectin has a viscosity of less than 10 cp.

7. The nutritional composition of claim 3 wherein said partially hydrolyzed pectin has a viscosity of less than 6 cp.

8. The nutritional composition of claim 1 wherein the amount of partially hydrolyzed pectin is about 0.1 g to about 20 g per 100 kcal of total composition.

9. The nutritional composition of claim 1 wherein the amount of partially hydrolyzed pectin is about 0.25 g to about 10 g per 100 kcal of total composition.

10. The nutritional composition of claim 1 wherein the amount of partially hydrolyzed pectin is about 0.4 g to about 3 g per 100 kcal of total composition.

11. The nutritional composition of claim 1 wherein the amount of component (a) is about 1 g to about 10 g per 100 kcal of total composition, the amount of component (b) is about 5 g to about 20 g per 100 kcal of total composition, the amount of component (c) is about 0.5 g to about 6 g per 100 kcal of total composition, and the amount of component (e) is about 0.25 g to about 10 g per 100 kcal of total composition.

12. The nutritional composition of claim 1 wherein the amount of component (a) is about 2 g to about 6 g per 100 kcal of total composition, the amount of component (b) is about 7.5 g to about 15 g per 100 kcal of total composition, the amount of component (c) is about 2 g to about 5.5 g per 100 kcal of total composition and the amount of component (e) is about 0.4 g to about 3 g per 100 kcal of total composition.

13. The composition of claim 1 further comprising water and having a Brookfield viscosity of about 2 cp to about 100 cp.

14. A nutritionally complete composition comprising (a) a nitrogen source; (b) a non-fiber carbohydrate source; (c) a lipid source; (d) vitamins and minerals; and (e) a fiber system comprising (i) partially hydrolyzed pectin having a peak molecular weight less than unmodified pectin and greater than 3,300, and (ii) an insoluble fiber.

15. The nutritional composition of claim 14 wherein the amount of component (a) is about 2 g to about 6 g per 100 kcal of total composition, the amount of component (b) is about 7.5 g to about 15 g per 100 kcal of total composition, the amount of component (c) is about 2 g to about 5.5 g per 100 kcal of total composition, and the amount of component (e) is about 0.4 g to about 3 g per 100 kcal of total composition.

16. The nutritional composition of claim 14 wherein said insoluble fiber is oat hull fiber, soy fiber or a mixture thereof.

17. The nutritional composition of claim 14 wherein component (e) comprises about 45 to about 55 weight % of component (i) and about 45 to about 55 weight % of component (ii) and wherein component (ii) is oat hull fiber, soy fiber or a mixture thereof.

18. The nutritional composition of claim 14 wherein said partially hydrolyzed pectin has a peak molecular weight of between 10,000 and 200,000.

19. The nutritional composition of claim 14 wherein said partially hydrolyzed pectin has a peak molecular weight of between 15,000 and 100,000.

20. A nutritionally complete composition comprising (a) a nitrogen source; (b) a non-fiber carbohydrate source; (c) a lipid source; (d) vitamins and minerals; and (e) a fiber system comprising (I) partially hydrolyzed pectin having a peak molecular weight less than unmodified pectin and greater than 3,300, and (II) at least one non-fermentable fiber.

* * * * *